US009270024B2

(12) United States Patent
Doi

(10) Patent No.: US 9,270,024 B2
(45) Date of Patent: *Feb. 23, 2016

(54) RADIO APPARATUS, AND METHOD AND PROGRAM FOR CONTROLLING SPATIAL PATH

(71) Applicant: HERA WIRELESS S.A., Luxembourg (LU)

(72) Inventor: Yoshiharu Doi, Gifu (JP)

(73) Assignee: HERA WIRELESS S.A., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 14/532,095

(22) Filed: Nov. 4, 2014

(65) Prior Publication Data

US 2015/0056932 A1    Feb. 26, 2015

Related U.S. Application Data

(60) Continuation of application No. 13/786,888, filed on Mar. 6, 2013, now Pat. No. 8,934,851, which is a continuation of application No. 13/098,878, filed on May 2, 2011, now Pat. No. 8,412,115, which is a division of application No. 12/463,657, filed on May 11, 2009, now Pat. No. 7,962,103, which is a division of application No. 10/508,655, filed as application No. PCT/JP03/02883 on Mar. 11, 2003, now Pat. No. 7,539,461.

(30) Foreign Application Priority Data

Mar. 22, 2002    (JP) .................................. 2002-081375

(51) Int. Cl.
*H04B 7/04* (2006.01)
*H01Q 3/26* (2006.01)
*H01Q 1/24* (2006.01)
*H04B 7/10* (2006.01)
*H04B 7/06* (2006.01)
*H04B 7/08* (2006.01)

(52) U.S. Cl.
CPC ............ *H01Q 3/2605* (2013.01); *H01Q 1/246* (2013.01); *H04B 7/04* (2013.01); *H04B 7/0408* (2013.01); *H04B 7/0417* (2013.01); *H04B 7/10* (2013.01); *H04B 7/06* (2013.01); *H04B 7/0617* (2013.01); *H04B 7/086* (2013.01)

(58) Field of Classification Search
CPC ...... H04B 7/02; H04B 7/0417; H04B 7/0456; H04B 7/06; H04B 7/0619; H01Q 3/2605
See application file for complete search history.

(56) References Cited

U.S. PATENT DOCUMENTS

| 7,539,461 | B2 * | 5/2009 | Doi | 455/69 |
| 7,962,103 | B2 * | 6/2011 | Doi | 455/69 |
| 8,412,115 | B2 * | 4/2013 | Doi | 455/69 |
| 8,934,851 | B2 * | 1/2015 | Doi | 455/69 |

OTHER PUBLICATIONS

The office action letter issued on Oct. 27, 2014, in the counterpart European patent application.

* cited by examiner

*Primary Examiner* — Andrew Wendell
(74) *Attorney, Agent, or Firm* — DC Patent Lawyers, PLLC

(57) ABSTRACT

A PDMA terminal (1000) establishes communication by forming a plurality of spatial paths to another single radio apparatus. A plurality of antennas constituting an array antenna are divided into a plurality of subarrays corresponding to the plurality of spatial paths respectively. An adaptive array processing unit (USP) can perform an adaptive array processing for each of the plurality of subarrays. A memory (MMU) stores in advance information on the number of antennas associated with the number of spatial paths that can be formed by the array antenna. A control unit (CNP) controls a processing to transmit possible multiplicity information to another radio apparatus at a prescribed timing.

20 Claims, 21 Drawing Sheets

RADIO APPARATUS, AND METHOD AND PROGRAM FOR CONTROLLING SPATIAL PATH

This application is a continuation application of U.S. patent application Ser. No. 13/786,888, filed on Mar. 6, 2013, which is a continuation of U.S. patent application Ser. No.13/098,878, filed on May 2, 2011, which is a divisional of U.S. patent application Ser. No. 12/463,657, filed on May 11, 2009, which is a divisional of U.S. patent application Ser. No. 10/508,655, filed on Sep. 22, 2004, which is a U.S. National Phase under 35 U.S.C. §371 of International Application No. PCT/JP2003/002883, filed on Mar. 11, 2003, which is based upon and claims priority based on 35 USC 119 from prior Japanese Patent Application No. 2002-081375, filed on Mar. 22, 2002; the entire contents of which are incorporated herein by reference.

TECHNICAL FIELD

The present invention relates to a radio apparatus, and a method and a program for controlling a spatial path, and more particularly to a radio apparatus capable of establishing multiplex communication between one radio terminal and a radio base station via a plurality of paths formed by space division, as well as to a method and a program for controlling a spatial path.

BACKGROUND ART

Recently, as a communication scheme for a rapidly developing mobile communication system, for example, PHS (Personal Handy phone System), a TDMA scheme in which 1 frame (5 ms) consisting of respective 4 slots (1 slot: 625 μs) for transmission and reception is regarded as a base unit has been adopted. Such a communication scheme for PHS is standardized as the "second generation cordless communication system," for example.

A signal of 1 frame is divided into 8 slots, that is, first 4 slots serve for reception, while following 4 slots serve for transmission, for example.

Each slot consists of 120 symbols. For example, in a signal of 1 frame, assuming that one reception slot and one transmission slot form one pair, three pairs of slots are allocated as traffic channels for three users, and remaining one pair of slots is allocated as a control channel, respectively.

In the PHS system, in a control procedure for establishing synchronization, a link channel is initially established by the control channel, followed by a processing for measuring an interference wave (an undesired wave: U wave). In addition, after a processing for setting communication condition by the allocated channel, speech communication is started. Such a procedure is disclosed in detail in Personal Handy Phone System RCR Standard RCR STD-28 (published by Association of Radio Industries and Businesses), which is a standard of PHS.

FIG. 19 shows a flow in such a communication sequence in PHS. In the following, brief description thereof will be provided with reference to FIG. 19.

First, a C channel (control channel: CCH) is used to transmit a link channel establishment request signal (LCH establishment request signal) from a PHS terminal to a base station. A PHS base station detects an empty channel (empty traffic channel: empty T channel) (carrier sensing), and uses the C channel to transmit a link channel allocation signal (LCH allocation signal) designating an empty T channel to the PHS terminal.

In the PHS terminal, whether or not an interference wave signal having a power larger than a prescribed level is received is measured in the designated T channel (U wave measurement) based on link channel information received from the PHS base station. When the interference wave signal with a power larger than a prescribed level is not detected, that is, when other PHS base station does not use the designated T channel, the PHS terminal uses the designated T channel to transmit a synchronous burst signal to the base station. Meanwhile, the base station sends back a synchronous burst signal to the terminal. Synchronization is thus established.

On the other hand, when an interference wave signal having a power larger than a prescribed level is detected in the designated T channel, that is, when the T channel is being used by other PHS base station, the PHS terminal repeats the control procedure from the link channel establishment request signal.

In this manner, in the PHS system, a traffic channel between a terminal and a base station is connected, using a channel where the interference wave is weak and excellent communication performance is attained.

In the PHS, a PDMA (Path Division Multiple Access) scheme has been implemented, in which, in order to enhance an efficiency in utilizing a frequency of a radio wave, mobile radio terminal units (terminals) of a plurality of users establish spatial multiple connection to a radio base station (base station) through a plurality of paths formed by spatially dividing an identical time slot of an identical frequency.

The PDMA scheme adopts an adaptive array technique, for example. In an adaptive array processing, based on a reception signal from a terminal, a weight vector consisting of reception coefficients (weights) for respective antennas in the base station is calculated for adaptive control, and a signal from a desired terminal is accurately extracted.

With such an adaptive array processing, an uplink signal from the antenna of each user terminal is received by the array antenna of the base station, and then separated and extracted with reception directivity. A downlink signal from the base station to the terminal is transmitted from the array antenna with transmission directivity to the antenna of the terminal.

Such an adaptive array processing is a well-known technique, and described in detail, for example, in Nobuyoshi Kikuma, "Adaptive Signal Processing by Array Antenna", Kagaku Gijutsu Shuppan, pp. 35-49, "Chapter 3: MMSE Adaptive Array" published on Nov. 25, 1998. Therefore, description of its operation principle will not be provided.

FIG. 20A is a conceptual view schematically illustrating an example in which one terminal 2 with a single antenna is connected to a PDMA base station 1 via one of a plurality of paths formed by space division in a mobile communication system (PHS) adopting the PDMA scheme.

More specifically, PDMA base station 1 receives an uplink signal from one antenna 2a of terminal 2 with an array antenna 1a, and the signal is separated and extracted with reception directivity through the above-described adaptive array processing. On the other hand, array antenna 1a of PDMA base station 1 transmits a downlink signal with transmission directivity to one antenna 2a of terminal 2. Terminal 2 receives the downlink signal with its antenna 2a without adaptive array processing.

FIG. 20B is a timing chart schematically showing a manner of channel allocation in this example. In the example of FIG. 20B, users 1 to 4 establish time-division multiplexed to respective time slots obtained by division in a direction of time axis at an identical frequency. Here, one user is allocated to each slot via one path in a spatial direction.

Identification of a desired signal out of signals received in the PDMA scheme is performed in the following manner. A radio wave signal transmitted/received between a terminal such as a mobile phone and a base station is transmitted in what is called a frame configuration including a plurality of frames. For example, each frame includes a total of 8 slots, that is, 4 slots for uplink communication and 4 slots for downlink communication. Broadly speaking, the slot signal is constituted of a preamble consisting of a signal sequence already known to a reception side, and data (such as voice) consisting of a signal sequence unknown to the reception side.

The signal sequence in the preamble includes a signal train (reference signal: unique word signal, for example) of information for discerning whether or not a sender is a desired party for the reception side to establish communication. For example, an adaptive array radio base station performs weight vector control (determines weight coefficient) so as to extract a signal that seems to include a signal sequence corresponding to a desired party, based on comparison of the received signal sequence with the unique word signal taken out from a memory.

In addition, each frame is assumed to have a configuration in which a unique word signal (reference signal) section described above is included and cyclic redundancy check (CRC) is enabled.

In contrast, an MIMO (Multi Input Multi Output) scheme has been proposed, in which multiplex communication is established between one terminal having a plurality of antennas and a PDMA base station via a plurality of spatial paths of an identical frequency and an identical time slot.

Communication technologies for such MEMO scheme are described in detail, for example, in Nishimura et al., "SDMA Downlink Beamforming for a MIMO Channel," Technical Report of MICE, A-P2001-116, RCS2001-155, pp. 23-30, October 2001, and in Tomisato et al., "Radio Signal Processing for Mobile MIMO Signal Transmission," Technical Report of IEICE, A-P2001-97, RCS2001-136, pp. 43-48, October 2001.

FIG. 21 is a conceptual view schematically illustrating an example in which one terminal PS1 with two antennas establishes spatial multiple connection to a PDMA base station CS1 via a plurality of paths (e.g. two paths) PTH1, PTH2 formed by space division in the mobile communication system (PHS) adapted to such MIMO scheme.

More specifically, PDMA base station CS1 receives uplink signals from respective two antennas 12a, 12b of terminal CS1 with an array antenna 11a, and the signals are separated and extracted with reception directivity through the above-described adaptive array processing.

On the other hand, array antenna 11a of PDMA base station CS1 transmits downlink signals with transmission directivity to respective two antennas 12a, 12b of terminal PS1. Terminal PS1 receives corresponding downlink signals with its respective antennas without adaptive array processing.

FIG. 22 is a timing chart schematically showing a manner of channel allocation in this example. In the example of FIG. 22, users 1 to 4 are time-division multiplexed to respective time slots divided in a direction of time axis at an identical frequency. An identical user is allocated in a manner of multiple connection to each slot via two paths in a spatial direction.

For example, noting a first time slot in FIG. 22, user 1 is allocated to all channels via two spatial paths. Then, a signal of user 1 is divided and transmitted between the terminal and the base station via two paths in the identical slot, and the divided signals are reconfigured on the reception side. Two-paths-for-one-user scheme as shown in FIG. 22 can double a communication speed, as compared with one-path-for-one-user scheme in FIG. 20B.

Here, some of the plurality of spatial paths in the identical slot in the PDMA scheme may be used to establish communication in multiple-paths-for-one-user scheme as shown in FIG. 21. Concurrently, remaining paths may be used to establish communication in one-path-for-one-user scheme as shown in FIGS. 20A and 20B.

A specific method of transmission/reception of a signal in the MIMO scheme as shown in FIG. 21 is disclosed in detail in Japanese Patent Laying-Open No. 11-32030, for example.

In the MIMO scheme as shown in FIG. 21, the terminal side prepares antennas in the number corresponding to the number of paths to be set, so as to establish communication.

If a failure occurs on a propagation path, however, there is no degree of freedom in that path allowing for avoiding such a failure. Eventually, disconnection of the path has been likely.

In this manner, though improvement in the communication speed can be expected with the conventional MIMO scheme in an environment where a condition for communication is excellent, it is difficult in some cases to achieve a stable communication speed.

Accordingly, an object of the present invention is to provide a radio apparatus capable of adaptive modification in connection of a plurality of paths between a terminal and a base station in accordance with a communication condition in a mobile communication system where communication is established with a multiple-paths-for-one-user scheme such as the MIMO scheme, as well as a method and a program for controlling a spatial path.

DISCLOSURE OF THE INVENTION

According to one aspect of the present invention, a radio apparatus can establish communication by forming a plurality of spatial paths to another single radio apparatus. The radio apparatus includes a plurality of antennas constituting an array antenna, and the plurality of antennas are divided into a plurality of subarrays corresponding to the plurality of spatial paths respectively. The radio apparatus further includes adaptive array means capable of adaptive array processing for each of the plurality of subarrays; storage means for storing in advance information on possible multiplicity associated with a number of spatial paths that can be formed by the array antenna; and control means for controlling a processing to transmit the information on possible multiplicity to another radio apparatus at a prescribed timing.

Preferably, the information on possible multiplicity is information on a total number of the plurality of antennas.

Preferably, the radio apparatus further includes monitor means for detecting a communication status for each of the plurality of antennas. The information on possible multiplicity is information associated with a maximum number of spatial paths that can be used for multiplex communication, determined based on a detection result by the monitor means.

Preferably, the monitor means detects a number of antennas that can attain normal reception, and the information on possible multiplicity is information on a maximum number of antennas that can attain normal reception.

Preferably, a signal transmitted/received by the radio apparatus is divided into a plurality of frames. The monitor means detects an error rate for each frame in each spatial path. The information on possible multiplicity is information on a number of spatial paths that can be used for multiplex communication.

Preferably, the monitor means detects an amount of interference between the spatial paths, and the information on possible multiplicity is information on a number of spatial paths that can be used for multiplex communication.

Preferably, the adaptive array processing means can change a combination of the antennas allocated to each subarray to perform the adaptive array processing. The control means divides the plurality of antennas into a set or sets in a number corresponding to a number of paths, in accordance with the number of paths notified from another radio apparatus, to implement the set or sets of the antennas as each subarray.

Preferably, the adaptive array processing means can change a combination of the antennas allocated to each subarray to perform the adaptive array processing. The control means allocates one antenna out of the plurality of antennas to respective subarray or subarrays in a number corresponding to the number of paths notified from another radio apparatus, and subsequently allocates remaining antennas out of the plurality of antennas to each of the subarrays in a prescribed order.

Preferably, the control means preferentially allocates the antennas having an identical plane of polarization to an identical subarray.

Preferably, the radio apparatus further includes means for detecting a reception level for each antenna. The control means preferentially allocates the antennas having planes of polarization different from each other to an identical subarray.

Preferably, the adaptive array processing means can change a combination of the antennas allocated to each subarray to perform the adaptive array processing. The radio apparatus further includes monitor means for monitoring communication quality for each spatial path during communication. The control means changes the number of the antennas allocated to each subarray in accordance with a detection result of the monitor means.

According to another aspect of the present invention, a method of controlling a spatial path in a radio apparatus capable of communication by forming a plurality of spatial paths to another single radio apparatus is provided. The radio apparatus includes an array antenna constituted of a plurality of antennas that can be divided into a plurality of subarrays corresponding to the plurality of spatial paths respectively, and adaptive array means capable of adaptive array processing for each of the plurality of subarrays. The method includes the steps of storing in advance information on possible multiplicity associated with a number of spatial paths that can be formed by the array antenna; transmitting the information on possible multiplicity to another radio apparatus from the radio apparatus at a prescribed timing; and determining the antenna to be allocated to the subarray based on information specifying the number of the spatial paths provided from another radio apparatus.

Preferably, the method of controlling a spatial path further includes the step of detecting a number of antennas capable of normal reception in the radio apparatus. The information on possible multiplicity is information on a maximum number of antennas that can attain normal reception.

Preferably, a signal transmitted/received by the radio apparatus is divided into a plurality of frames. The method further includes the step of detecting an error rate for each frame for each of the spatial paths in the radio apparatus. The information on possible multiplicity is information on a number of spatial paths that can be used for multiplex communication.

Preferably, the method of controlling a spatial path further includes the step of detecting an amount of interference between the spatial paths in the radio apparatus. The information on possible multiplicity is information on a number of spatial paths that can be used for multiplex communication.

Preferably, the step of determining the antenna includes the step of dividing the plurality of antennas into a set or sets in the number corresponding to a number of paths, in accordance with the number of paths notified from another radio apparatus, to allocate the set or sets of the antennas to each subarray.

Preferably, the step of determining the antenna includes the step of allocating one antenna out of the plurality of antennas to respective subarray or subarrays in a number corresponding to the number of paths notified from another radio apparatus, followed by allocating remaining antennas out of the plurality of antennas to each subarray in a prescribed order.

Preferably, in the step of allocating antennas to the subarray, the antennas having an identical plane of polarization are preferentially allocated to an identical subarray.

Preferably, in the step of allocating antennas to the subarray, the antennas having planes of polarization different from each other are preferentially allocated to an identical subarray.

According to yet another aspect of the present invention, a program for controlling a spatial path in a radio apparatus capable of communication by forming a plurality of spatial paths to another single radio apparatus is provided. The radio apparatus includes an array antenna constituted of a plurality of antennas that can be divided into a plurality of subarrays corresponding to the plurality of spatial paths respectively, and adaptive array means capable of adaptive array processing for each of the plurality of subarrays. The program causes a computer to execute the steps of: storing in advance information on possible multiplicity associated with a number of spatial paths that can be formed by the array antenna; transmitting the information on possible multiplicity to another radio apparatus from the radio apparatus at a prescribed timing; and determining the antenna to be allocated to the subarray based on information specifying the number of the spatial paths provided from another radio apparatus.

Preferably, the method of controlling a spatial path further includes the step of detecting a number of antennas capable of normal reception in the radio apparatus. The information on possible multiplicity is information on a maximum number of antennas that can attain normal reception.

Preferably, a signal transmitted/received by the radio apparatus is divided into a plurality of frames. The method further includes the step of detecting an error rate for each frame for each of the spatial paths in the radio apparatus. The information on possible multiplicity is information on a number of spatial paths that can be used for multiplex communication.

Preferably, the method of controlling a spatial path further includes the step of detecting an amount of interference between the spatial paths in the radio apparatus. The information on possible multiplicity is information on a number of spatial paths that can be used for multiplex communication.

Preferably, the step of determining the antenna includes the step of dividing the plurality of antennas into a set or sets in a number corresponding to a number of paths, in accordance with the number of paths notified from another radio apparatus, to allocate the set or sets of the antennas to each subarray.

Preferably, the step of determining the antenna includes the step of allocating one antenna out of the plurality of antennas to respective subarray or subarrays in a number corresponding to the number of paths notified from another radio apparatus, followed by allocating remaining antennas out of the plurality of antennas to each subarray in a prescribed order.

Preferably, in the step of allocating antennas to the subarray, the antennas having an identical plane of polarization are preferentially allocated to an identical subarray.

Preferably, in the step of allocating antennas to the subarray, the antennas having planes of polarization different from each other are preferentially allocated to an identical subarray.

Therefore, according to the present invention, in a terminal or a base station in the mobile communication system adapted to the MIMO scheme, communication in each spatial path is established by antennas divided into subarrays. As the antennas adapted to each path or the number of paths are adaptively controlled in accordance with a communication status, stable communication in the MIMO scheme can be achieved.

The foregoing and other objects, features, aspects and advantages of the present invention will become more apparent from the following detailed description of the present invention when taken in conjunction with the accompanying drawings.

BEST MODES FOR CARRYING OUT THE INVENTION

Figure 1:
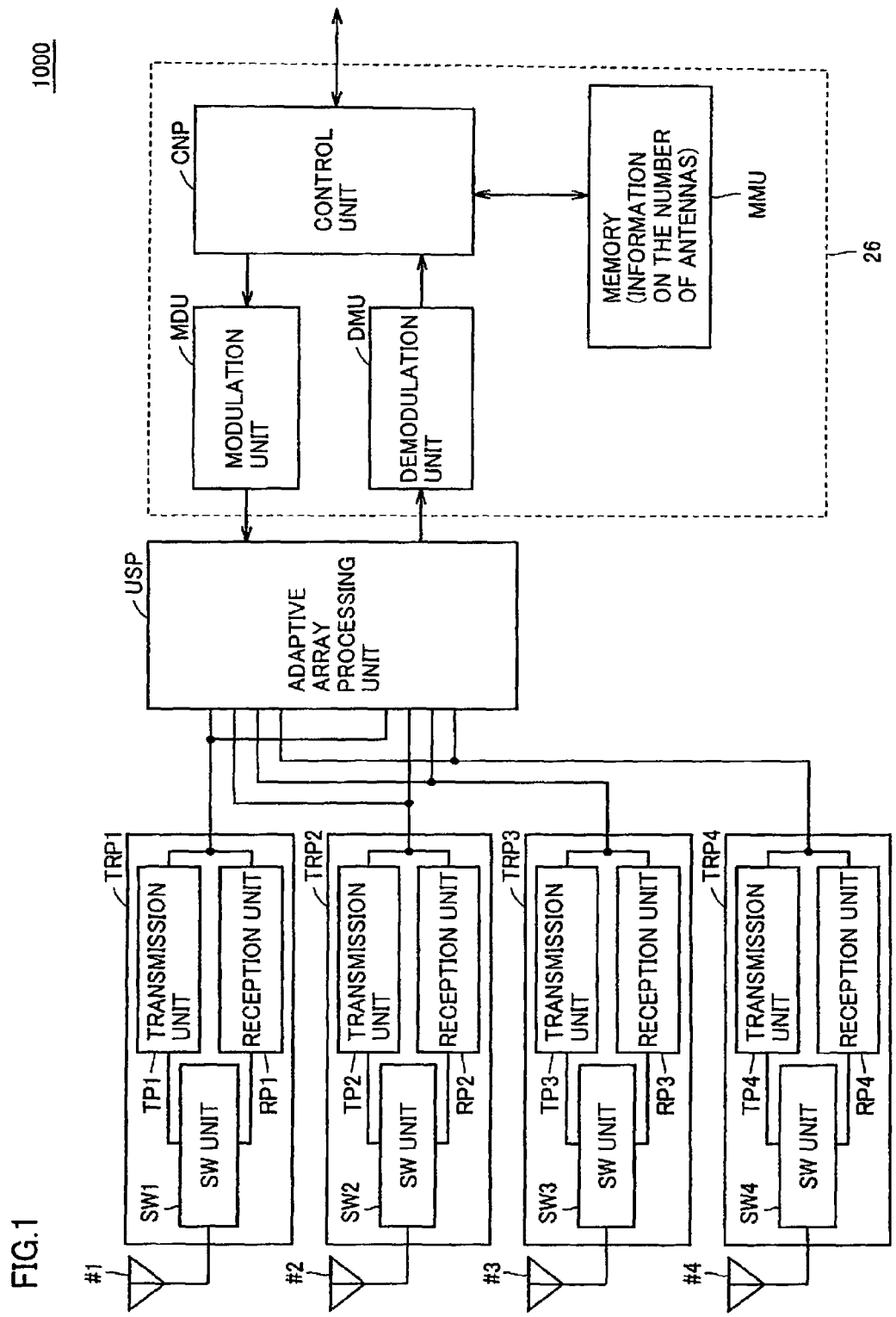
FIG. 1 is a functional block diagram showing a configuration of a PDMA terminal 1000 adapted to an MIMO scheme in a first embodiment of the present invention.

In the following, embodiments of the present invention will be described in detail with reference to the figures. It is noted that the same reference characters refer to the same or corresponding components in the figures.

(First Embodiment)

FIG. 1 is a functional block diagram showing a configuration of a PDMA terminal 1000 adapted to the MIMO scheme in a first embodiment of the present invention.

Referring to FIG. 1, PDMA terminal 1000 includes: transmission/reception units TRP1 to TRP4 providing transmission signals to an array antenna constituted of a plurality of antennas #1 to #4 or receiving reception signals; a signal processing unit USP subjecting signals from transmission/reception units TRP1 to TRP4 to adaptive array processing for separating and extracting a signal from a base station during communication, and adjusting an amplitude and a phase of the transmission signal so as to form transmission directivity to the base station during communication; a modulation unit MDU for modulating a signal provided to signal processing unit USP; a demodulation unit DMU for demodulating a signal from signal processing unit USP; a control unit CNP controlling a baseband signal provided to modulation unit MDU and a baseband signal provided from demodulation unit DMU, and controlling an operation of PDMA terminal 1000; and a memory MMU for holding information of the number of antennas for PDMA terminal 1000 (hereinafter, referred to as "antenna number information").

Here, a processing such as an adaptive array processing, a modulation processing, a demodulation processing, or a control processing performed by PDMA terminal 1000 can be performed, individually or as an integrated processing, with software by means of a digital signal processor.

Transmission/reception unit TRP1 includes a transmission unit TP1 for processing a high-frequency signal in transmission, a reception unit RP1 for processing a high-frequency signal in reception, and a switch unit SW1 for switching connection between antenna #1 and transmission unit TP1 or reception unit RP1 in accordance with a transmission mode or a reception mode. Other transmission/reception units TRP2 to TRP4 are configured in a similar manner.

When terminal 1000 is a PC card mounted to a personal computer, a signal from control circuit CNP may be output to the personal computer mounted with terminal 1000 via a not-shown interface. Alternatively, when terminal 1000 is an independent communication terminal, for example, a mobile phone, the signal from control circuit CNP may be provided to a processor for voice signal processing or the like within terminal 1000.

In the description above, though the number of antennas has been set to 4, more generally, it may be set to N (N: natural number). As described below, though the number of spatial paths for communication with the base station (hereinafter, simply referred to as "path") with respect to the number of antennas is set to 2, communication can be established with the possible number of paths in accordance with the number of antennas.

For example, it is assumed that the number of antennas is set to 4, and the number of paths is set to 2. Then, two series of adaptive array processing units corresponding to the two paths respectively should only be provided in advance in signal processing unit USP. When there are larger number of antennas or paths, similarly, adaptive array processing units in the number corresponding to respective paths should only be provided. In addition, if a combination of the antennas processed by each series should be changed, each series of adaptive array processing units and the antennas connected thereto should only be switched under control of control unit CNP.

Figure 2:
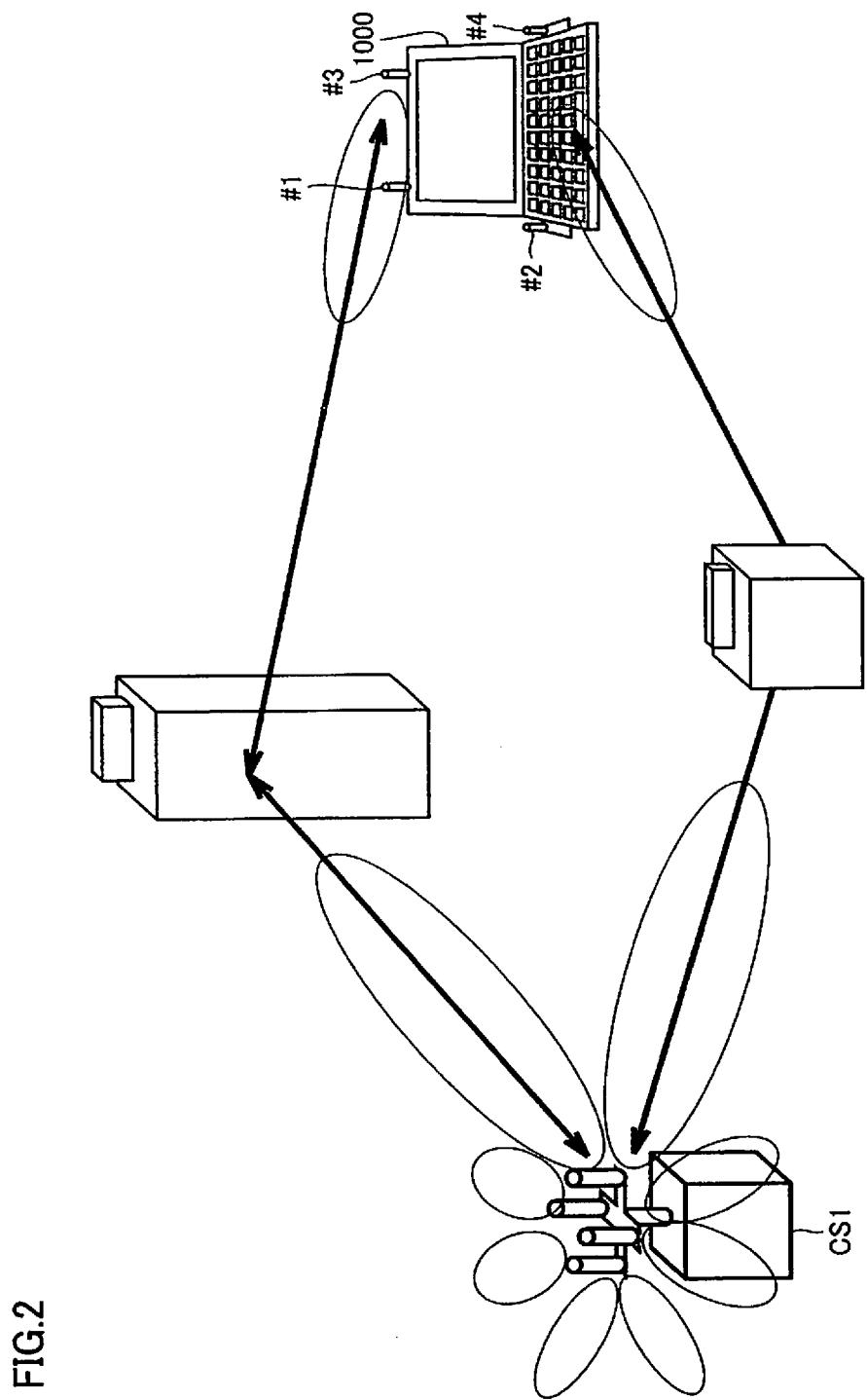
FIG. 2 is a conceptual view illustrating a state in which PDMA terminal 1000 according to the present invention and a PDMA base station CS1 are communicating with each other.

FIG. 2 is a conceptual view illustrating a state in which PDMA terminal 1000 according to the present invention and PDMA base station CS1 are communicating with each other.

As shown in FIG. 2, PDMA terminal 1000 has four antennas #1 to #4. PDMA terminal 1000 forms one path to base station CS1 with directivity by means of antennas #1 and #3, and forms another path to base station CS1 with transmission/reception directivity by means of antennas #2 and #4. For example, though not limited to such an example, a plurality of spatial paths for communication can be formed by forming transmission/reception directivity described above by utilizing the fact that an identical signal reaches PDMA terminal 1000 via different propagation paths due to an influence of buildings in a communication path.

For example, in terminal 1000 having four antennas, two subarrays serving as two-element adaptive array respectively are implemented in setting two paths with the array antenna. Here, two-element adaptive array reception and transmission is performed in one subarray.

As described above, memory MMU within terminal 1000 stores the "antenna number information". Therefore, terminal 1000 transmits the antenna number information to base station CS1 at a prescribed timing. Base station CS1 issues an instruction for the number of paths to be set to base station 1000 based on the antenna number information from terminal 1000. Terminal 1000 sets the number of paths to be formed in accordance with the instruction from base station CS1.

Figure 3:
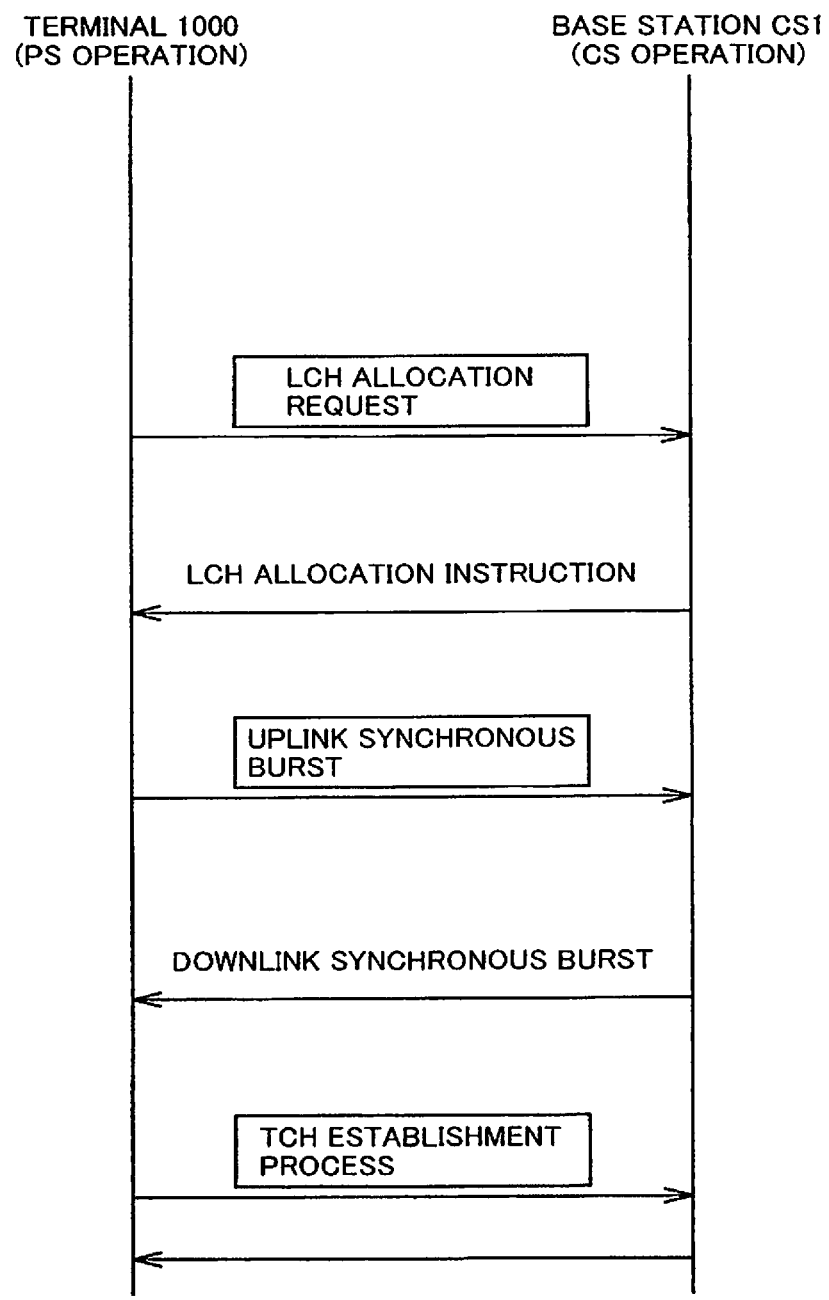
FIG. 3 is a flowchart illustrating an operation for notifying base station CS1 of information on the number of antennas from terminal 1000.

FIG. 3 shows a flow illustrating an operation for notifying base station CS1 of the antenna number information from terminal 1000 in such a manner.

Figure 19:
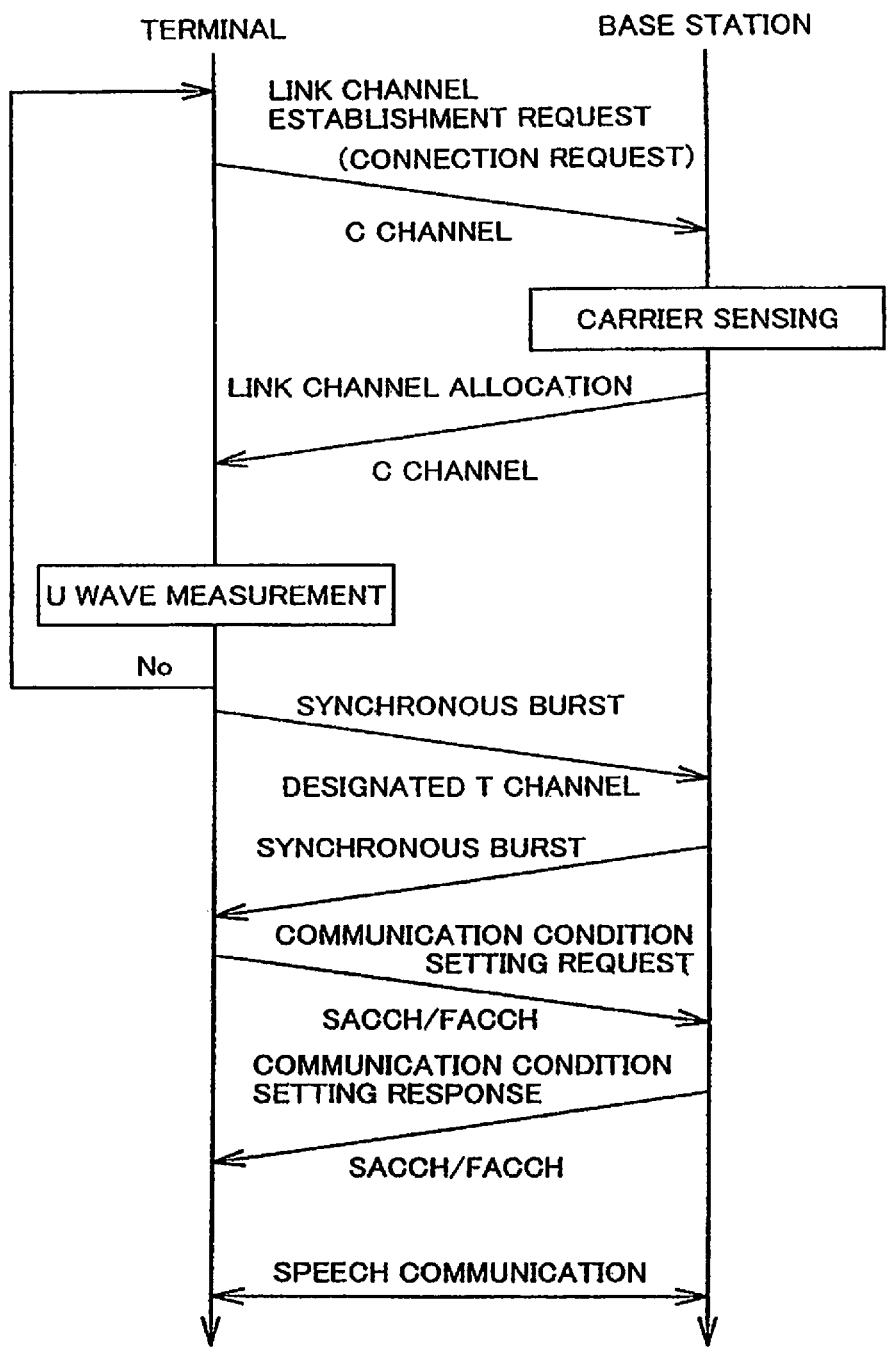
FIG. 19 shows a flow of a communication sequence in PHS.
Figure 20A:
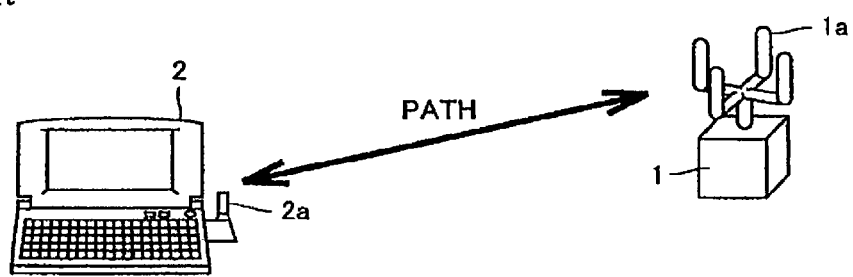
FIGS. 20A and 20B are conceptual views illustrating an example in which one terminal 2 with a single antenna is connected to a PDMA base station 1 via one of a plurality of paths formed by space division.
Figure 20B:
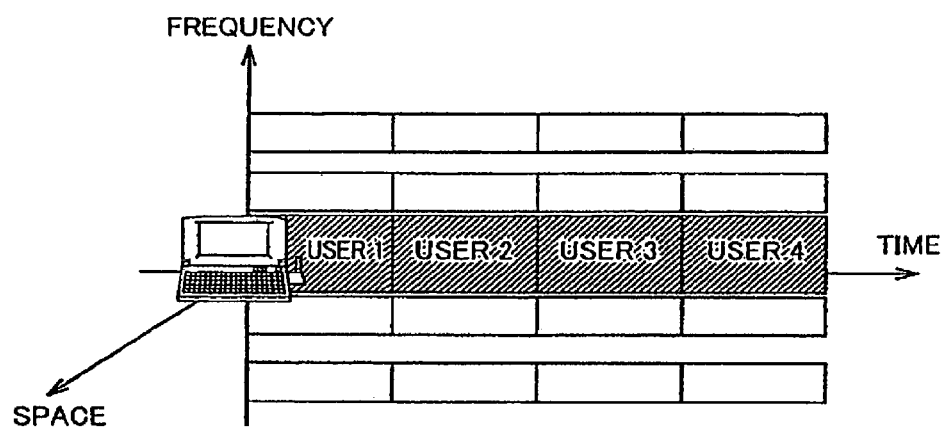
Figure 21:
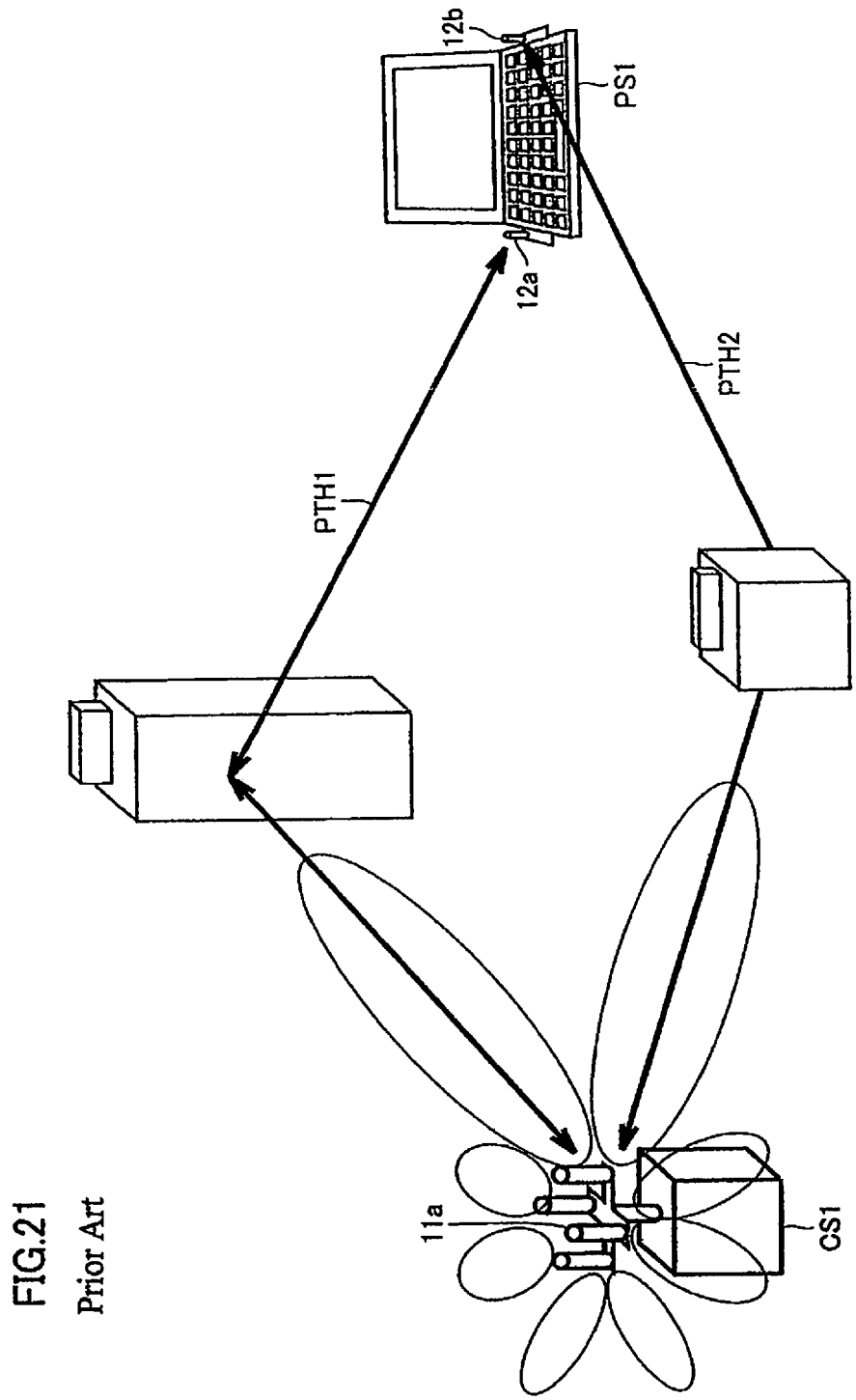
FIG. 21 is a conceptual view illustrating an example in which one terminal PS1 with two antennas establishes spatial multiple access to PDMA base station CS1 via paths PTH1, PTH2 formed by space division.
Figure 22:
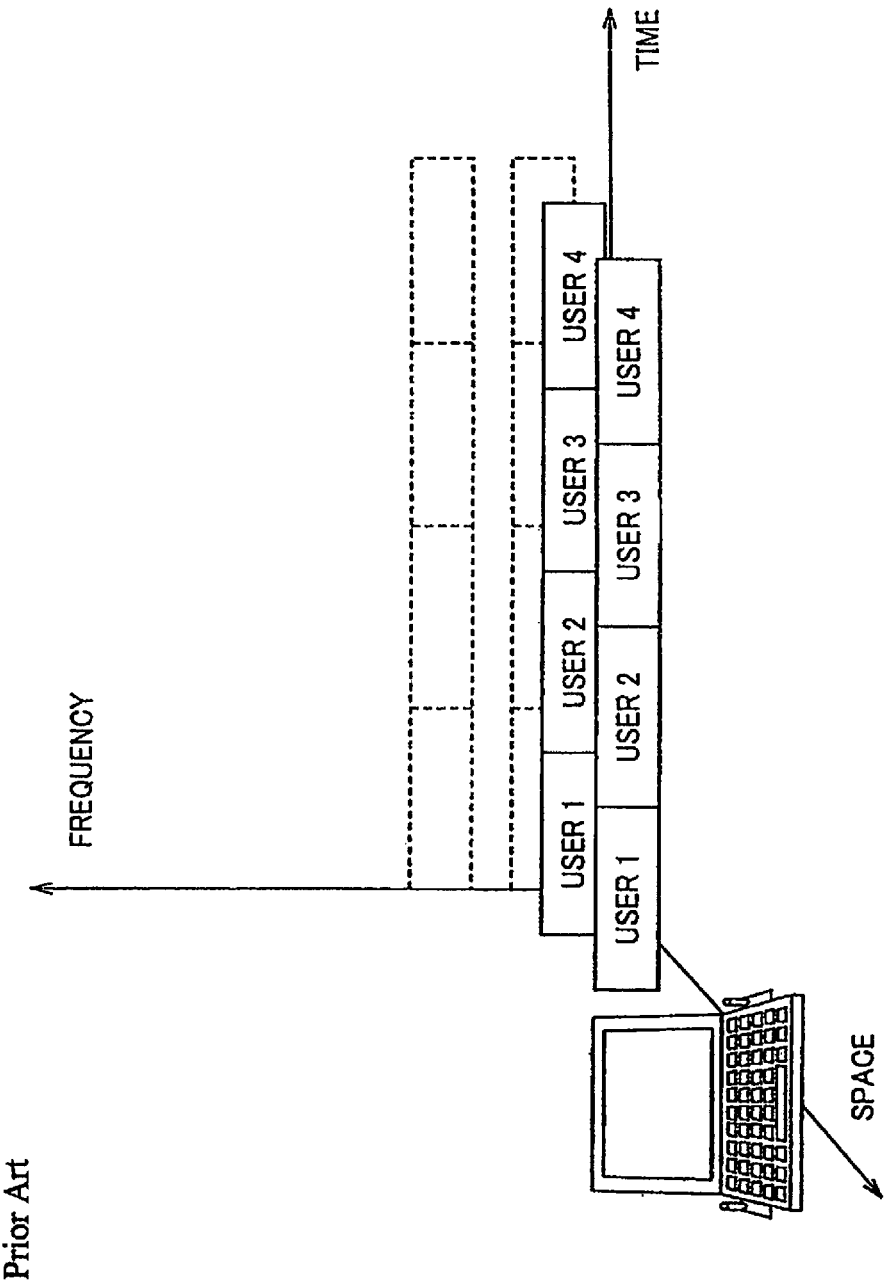
FIG. 22 is a timing chart schematically showing a manner of channel allocation.

In FIG. 3, solely a portion required for transmitting/receiving information between terminal 1000 and base station CS1 in a control procedure for establishing synchronization in a common PHS system described in connection with FIG. 19 is extracted for representation.

First, the antenna number information is transmitted to the base station from terminal 1000 as control information in requesting establishment of a link channel (LCH allocation request).

Base station CS1 gives an instruction for the number of paths stating that the number of paths to be set should be equal to or smaller than the number of antennas, as the control information for link channel allocation instruction, for example, based on the antenna number information from the terminal.

In succession, terminal 1000 transmits a synchronous burst signal to base station CS1 using a designated traffic channel (T channel), and the base station also sends back a synchronous burst signal to the terminal. Synchronization is thus established. Thereafter, the traffic channel (T channel) is activated based on the established synchronization, and communication is started.

Here, the base station adaptively modifies the number of paths set by terminal 1000 in accordance with the status during communication, and terminal 1000 is notified of a resultant value as the control information during communication.

Though the timing of notification of the antenna number information from terminal 1000 to base station CS1 has been set at the time of request of establishing the link channel in the description above, it may be at a control information stage during establishing the traffic channel (TCH), or alternatively, the antenna number information may be notified from terminal 1000 to base station CS1 as the control information after the traffic channel is established.

With the above-described configuration, in terminal 1000, a plurality of subarrays formed by dividing a plurality of antennas constituting an array antenna can control communication in one path establishing communication with base station CS1. Accordingly, the path can be formed in a flexible manner in accordance with a change in communication status between base station CS1 and terminal 1000. Therefore, even if the communication status is varied, stable multiplex communication can be achieved via a plurality of spatial paths of an identical frequency and an identical time slot.

(Variation of First Embodiment)

Figure 4:
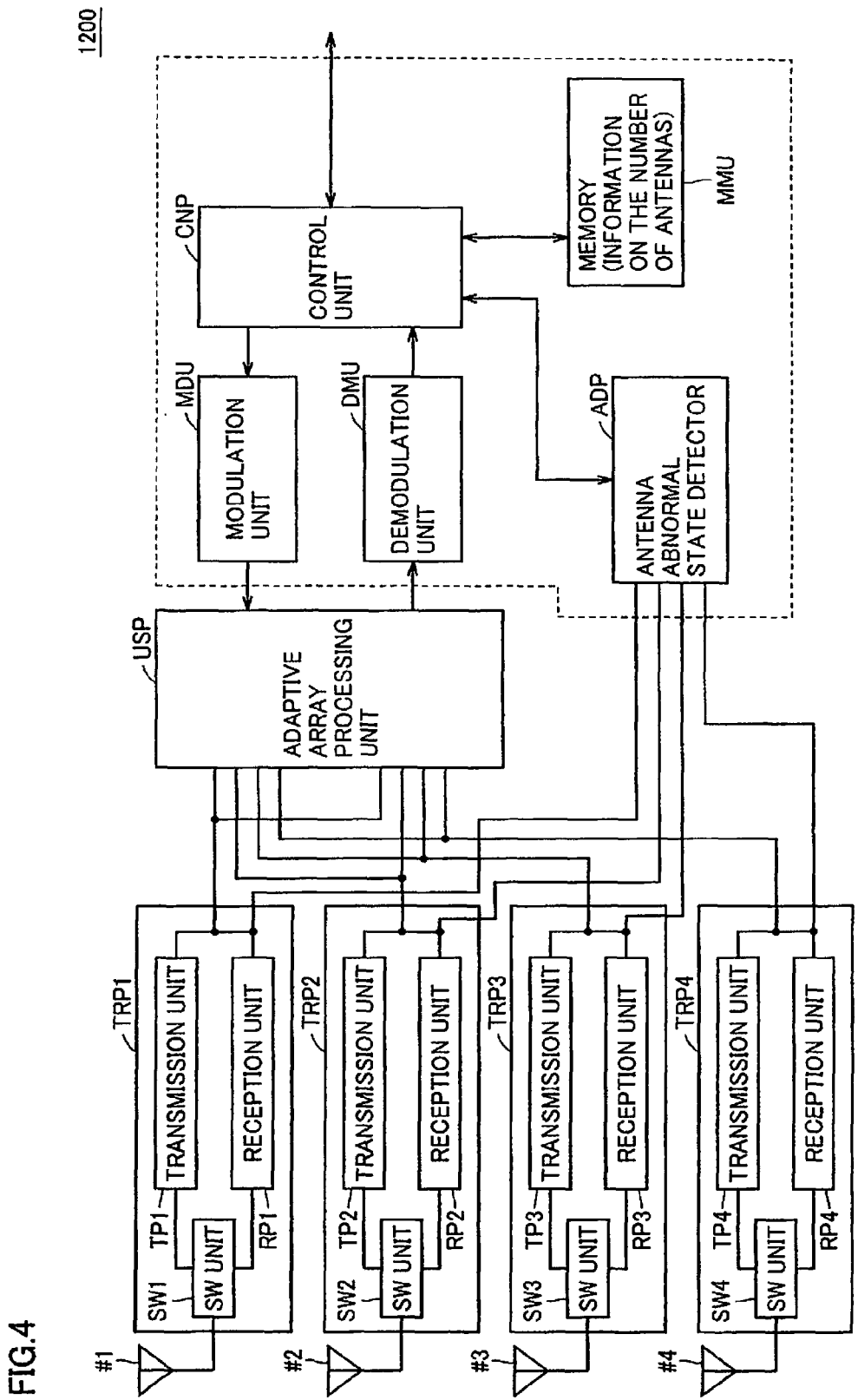
FIG. 4 is a schematic block diagram illustrating a configuration of a PDMA terminal 1200 in a variation of the first embodiment of the present invention.

FIG. 4 is a schematic block diagram illustrating a configuration of a PDMA terminal 1200 in a variation of the first embodiment of the present invention.

PDMA terminal 1200 in a second embodiment is different from PDMA terminal 1000 in the first embodiment shown in FIG. 1 in that terminal 1200 includes an antenna abnormal state detector ADP capable of detecting abnormality in a communication status for each antenna upon receiving communication information from each antenna #1 to #4.

As PDMA terminal 1200 is otherwise configured in a manner similar to PDMA terminal 1000, the same reference characters are given to the same or corresponding components and description thereof will not be repeated.

In terminal 1200, memory MMU stores not only the antenna number information, but also information on an antenna in an abnormal state (the number of antennas in an abnormal state and an abnormal antenna identifier) from antenna abnormal state detector ADP. Based on such information, terminal 1200 transmits the information on the number of antennas capable of normal transmission/reception to the base station at a prescribed timing similar to that in the first embodiment.

Base station CS1 determines the number of paths to be set based on the antenna number information from terminal 1200 indicating the maximum number of antennas capable of normal transmission/reception, and notifies terminal 1200 of the number of paths at a timing similar to that in the first embodiment.

With the above-described configuration, a plurality of spatial paths can be established without using antennas incapable of normal transmission/reception due to a status of hardware, communication status, or the like among the plurality of antennas, and stable multi-input multi-output multiplex communication can be achieved.

(Second Embodiment)

Figure 5:
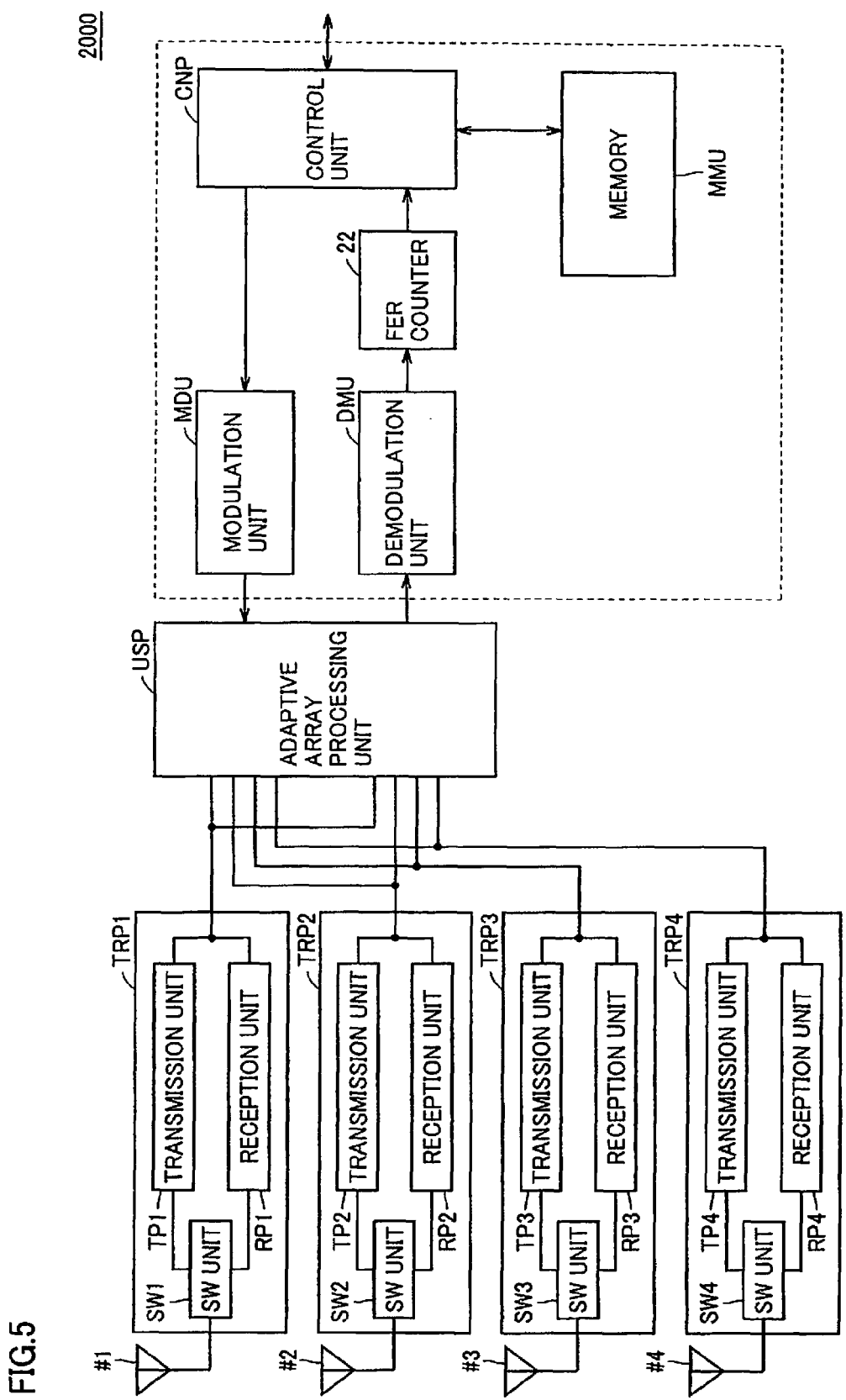
FIG. 5 is a schematic block diagram illustrating a configuration of a PDMA terminal 2000 in a second embodiment of the present invention.

FIG. 5 is a schematic block diagram illustrating a configuration of a PDMA terminal 2000 in a second embodiment of the present invention.

PDMA terminal 2000 is different from PDMA terminal 1000 shown in the first embodiment in that a signal from demodulation unit DWU is provided to an FER counter 22 detecting a frame error rate.

FER counter 22 counts the number of errors in a signal frame for each path. A resultant frame error rate (FER), which is an error rate per frame, is stored in memory MMU as one of elements in communication quality information for evaluating communication quality.

The demodulated signal of which errors are counted in FER counter 22 is provided to control unit CNP, which communicates with memory MMU, refers to the communication quality information of the downlink signal such as an FER held in memory MMU, and performs control of an uplink spatial path with a method of controlling a spatial path according to the present invention described later.

Here, a processing such as an adaptive array processing, a modulation processing, a demodulation processing, or a control processing, performed by PDMA terminal 2000 can be performed, individually or as an integrated processing, with software by means of a digital signal processor.

Terminal 2000 notifies base station CS1 of quality information for each spatial path acquired in a manner described above and held in MMU, or information on the antenna currently allocated to each path at a prescribed timing similar to that in the first embodiment.

Though the information held in memory MMU has been assumed as the antenna number information or FER data in the description above, not the number of antennas themselves but the FER data and the maximum number of paths P_MAX that can be formed in terminal 2000 determined from the FER data described above may be stored in MMU, for example.

(First Variation of Second Embodiment)

Figure 6:
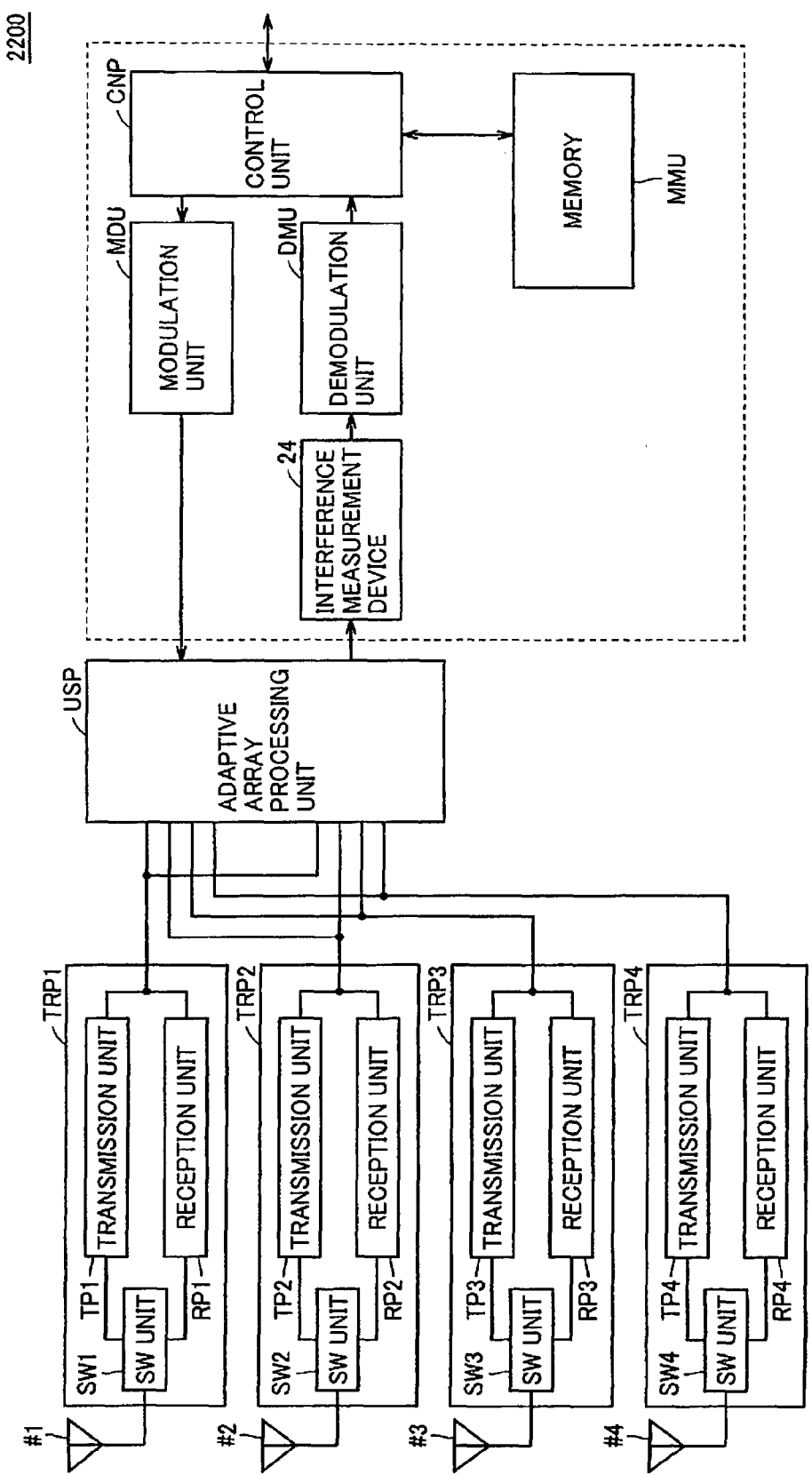
FIG. 6 is a schematic block diagram illustrating a configuration of a PDMA terminal 2200 in a first variation of the second embodiment of the present invention.

FIG. 6 is a schematic block diagram illustrating a configuration of a PDMA terminal 2200 in a first variation of the second embodiment of the present invention.

PDMA terminal 2200 is different from PDMA terminal 2000 in the second embodiment shown in FIG. 5 in that an interference measurement device 24 for measuring an amount of interference from another path with respect to a signal input to demodulation unit DMU is provided instead of FER counter 22, and memory MMU stores the information on communication quality in a path based on the amount of interference and information on antenna allocation, that is, how antennas are currently allocated to each path.

In this manner, based on the information on communication quality in the path and the information on antenna allocation stored in memory MMU, terminal 2200 notifies base station CS1 of the number of paths available for communication at a prescribed timing similar to that in the first embodiment.

Interference measurement device 24 measures an interference component contained in a complex reception signal input to the demodulation circuit.

In a method of measurement, an error component e(t) between a complex reception signal y(t) and a reference signal d(t) stored in memory MMU is calculated, and a power of that error signal component is regarded as a power of the interference signal.

Here, e(t) and the interference power are expressed in the following equations:

$$e(t)=y(t)-d(t)$$

$$(\text{interference power})=\Sigma|e(t)|/T$$

where T represents an observation time (or reference signal length).

With the above-described configuration as well, the communication quality for each path can be ascertained in terms of an amount of interference, and an effect as in the second embodiment can be obtained.

(Operation in Second Embodiment or First Variation of Second Embodiment)

Figure 7:
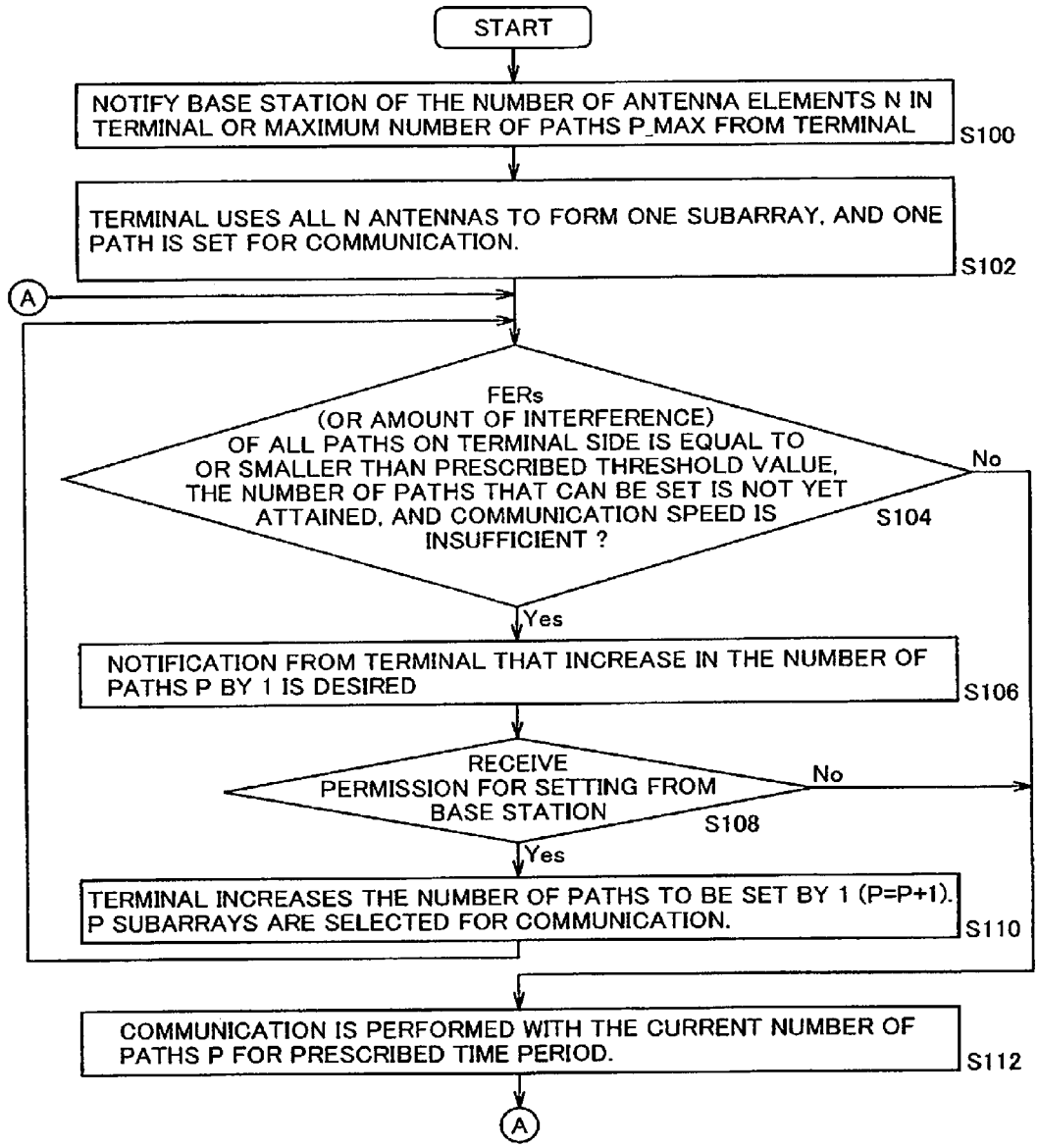
FIG. 7 is a flowchart showing a flow in adaptive control of the number of paths to be set in PDMA terminal 2000 or PDMA terminal 2200.

FIG. 7 is a flowchart showing a flow in adaptive control of the number of paths set in PDMA terminal 2000 in the second embodiment described in connection with FIG. 5 or PDMA terminal 2200 in the first variation of the second embodiment described in connection with FIG. 6.

In the following, an operation of PDMA terminal 2000 in the second embodiment will basically be described, and subsequently, difference from the operation of PDMA terminal 2000 will be described with respect to an operation of PDMA terminal 2200 in the first variation of the second embodiment.

Referring to FIG. 7, first, terminal 2000 notifies base station CS1 of the number of antenna elements N in the terminal or the maximum number of paths P_MAX (step S100).

In terminal 2000, the total N antennas are used to form one subarray, and one path is set for communication (step S102).

In succession, in terminal 2000, communication quality is evaluated by the FER for each path. It is determined whether FERs of all paths are equal to or smaller than a prescribed threshold value, whether the number of paths that can be set has not yet been attained, and whether or not the communication speed is insufficient (step S104).

Here, the expression that "communication speed is insufficient" means that, when an amount of data to be transferred is compared with the current communication speed, transfer is not completed in a sufficiently short period of time in terminal 2000 with respect to a processing of an application during execution, for example.

When it is determined in step S104 that, with regard to the communication quality for each path and the number of paths that can be set, the number of paths can further be increased and the communication speed is insufficient, notification that an increase in the number of paths P by 1 is desired is transmitted from terminal 2000 to base station CS1 (step 106).

Then, when terminal 2000 receives permission for setting from base station CS1 (step S108), terminal 2000 increases the number of paths to be set by 1. In response, terminal 2000 selects P (P=P+1) subarrays for communication (step S110), and the processing returns to step S104

On the other hand, when it is determined in step S104 that the communication status is poor or the communication speed is sufficient, or when permission for setting from the base station is not received in step S108, communication is performed with the current number of paths for a prescribed time period (step S112), and the processing returns to step S104.

With the above-described processing, while the number of paths to be set for multi-input multi-output communication is adaptively modified, communication between base station CS1 and terminal 2000 can be established. While maintaining excellent communication quality and excellent communication speed, communication in the MIMO scheme can be attained.

It is to be noted in FIG. 7 that the number of antennas is in principle divisible by the number of paths designated by the base station.

In other words, the number of antennas in the antenna set (subarray) transmitting/receiving an identical signal to be set is obtained by dividing the total number of antennas by the number of paths to be set.

For example, when a terminal has a total of 4 antennas and two paths are set, two pairs (subarrays) each formed with two antennas are prepared.

Then, each subarray performs transmission/reception in each path.

In an operation of terminal 2200 in the first variation of the second embodiment, in step S104, the communication quality of the path is evaluated not based on the FER value for each path but based on the amount of interference for each path.

(Second Variation of Second Embodiment)

In a second variation of the second embodiment described below, unlike FIG. 7, a method of adaptive control of the number of paths to be set, which is applicable even when the number of paths designated by the base station cannot divide the number of antennas, will be described.

Such an operation can also be processed in terminal 2000 and terminal 2200.

Figure 8:
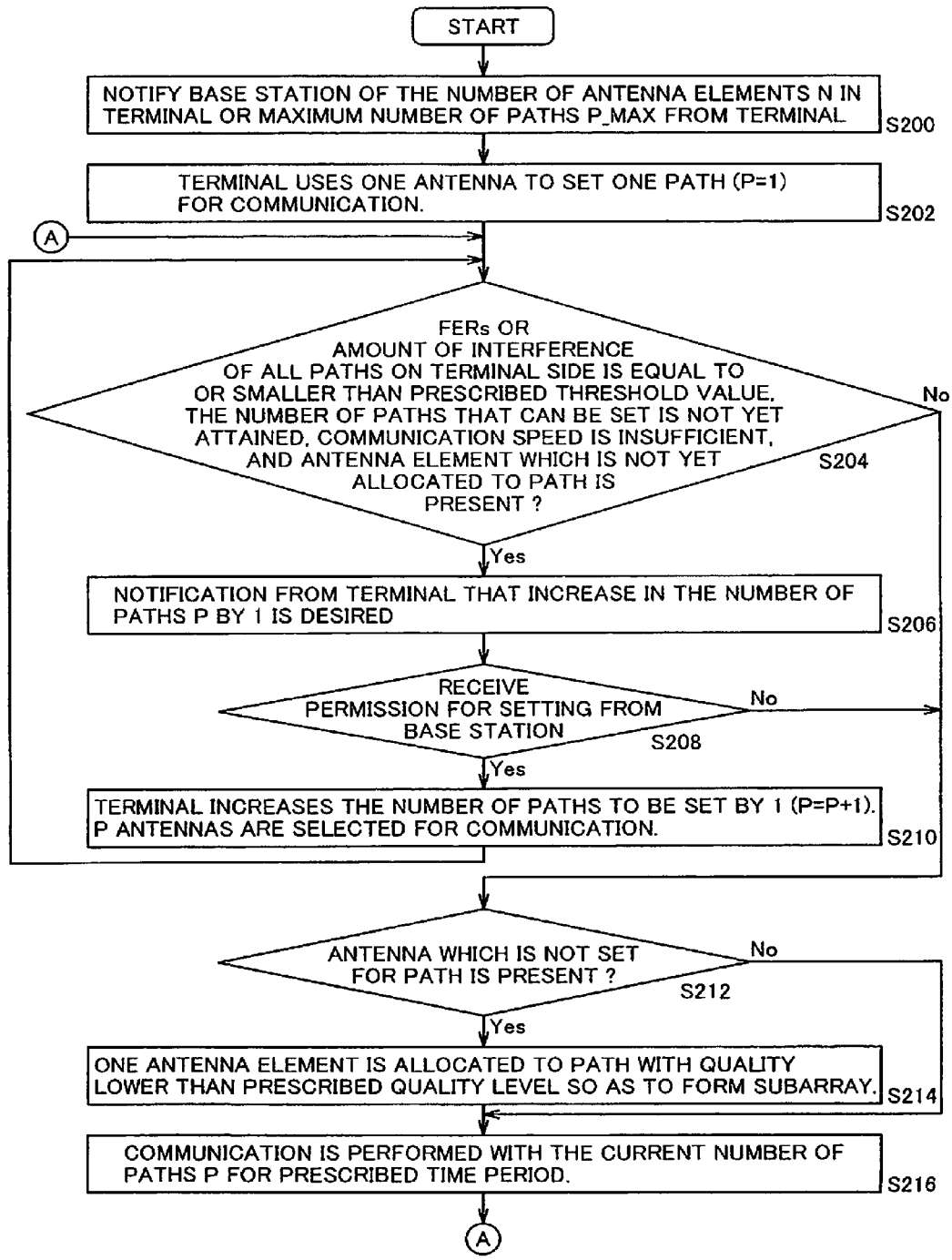
FIG. 8 is a flowchart showing a method of adaptive control of the number of paths to be set with regard to terminal 2000 in a second variation of the second embodiment.

FIG. 8 is a flowchart showing a method of adaptive control of the number of paths to be set with regard to terminal 2000 in the second variation of the second embodiment.

Referring to FIG. 7, terminal 2000 notifies base station CS1 of the number of antenna elements N in the terminal. Alternatively, the maximum number of paths P_MAX may be notified (step S200).

In terminal 2000, one antenna is used to set one path (the number of paths P is set to 1) for communication (step S202).

In succession, in terminal 2000, it is determined whether FERs of all paths on terminal side are equal to or smaller than a prescribed threshold value, that is, the communication status is determined to be so excellent as to allow increase in the number of paths, whether the current number of paths has not yet reached the number of paths that can be set, whether or not the communication speed is insufficient, and whether or not an antenna element which is not yet allocated to the path is present (step S204).

When the conditions in step S204 are satisfied, notification that increase in the number of paths P by 1 is desired is transmitted from terminal 2000 to base station CS1 (step S206).

When terminal 2000 receives permission for setting from base station CS1 (step S208), terminal 2000 increases the number of paths to be set by 1 (P←P+1), and P antennas are selected to start communication (step S210), and the processing returns to step S204.

When the conditions in step S204 are not satisfied, or when permission for setting from base station CS1 is not received in step S208, whether or not an antenna which is not set for a path is present is determined (step S212). When an antenna which has not been set is remaining, one antenna element is further allocated to a path which is determined to have attained a quality lower than a prescribed level, so as to form a subarray (step S214).

In succession, communication is performed with the current number of paths P for a prescribed time period (step S216), and the processing returns to step S204.

On the other hand, when there is no remaining antenna which has not been set for a path in step S212, the processing moves to step S216.

In other words, in the second variation of the second embodiment, the number of antennas for each subarray is determined in the following manner. One antenna is first allocated to each set path. Then, among remaining antennas, an additional antenna is sequentially allocated to each path in accordance with the path identifier or the antenna identifier while determining necessity for the increase in the number of antennas. For example, when all subarrays are provided with two antennas each, remaining antennas are again allocated. With such a process, each subarray performs transmission/reception in each path.

With above-described allocation of antennas to each path, the optimal number of antennas can be arranged for each path even when the number of antennas is not necessarily divisible by the number of paths which perform transmission/reception between base station CS1 and terminal 2000. Communication in the MIMO scheme is thus enabled.

In an operation of terminal 2200 in the first variation of the second embodiment, in step S104, the communication quality of the path is evaluated not based on the FER value for each path but based on the amount of interference for each path.

(Third Embodiment)

In the first and second embodiments, an arrangement of antennas used in the MIMO scheme has not been limited in particular.

In a third embodiment, a configuration in which further improvement in the communication quality is attained by employing a specific arrangement of a plurality of antennas will be described.

Figure 9:
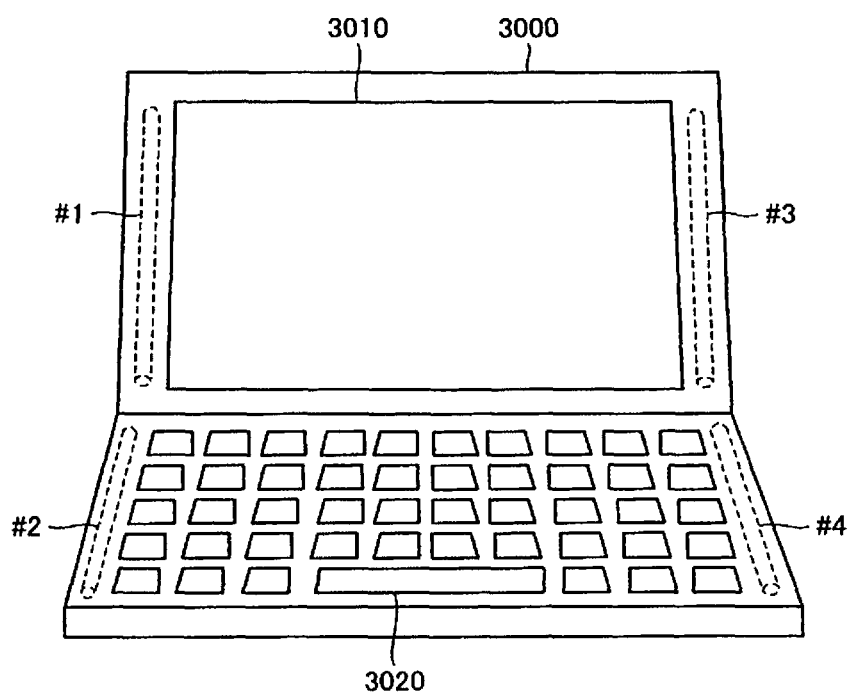
FIG. 9 shows a configuration in which four antennas #1 to #4 are arranged in a notebook personal computer 3000.

FIG. 9 shows a configuration in which four antennas #1 to #4 are arranged for a notebook personal computer 3000.

Antennas #1 and #3 are arranged on opposing ends of a display 3010 of notebook personal computer 3000, and antennas #2 and #4 are arranged on opposing ends of a keyboard. Here, in such a spatial arrangement of the antennas, antennas #1 and #3 operate as antennas in an identical plane of polarization (vertical polarization), while antennas #2 and #4 operate as antennas in an identical plane of polarization (horizontal polarization).

Figure 10:
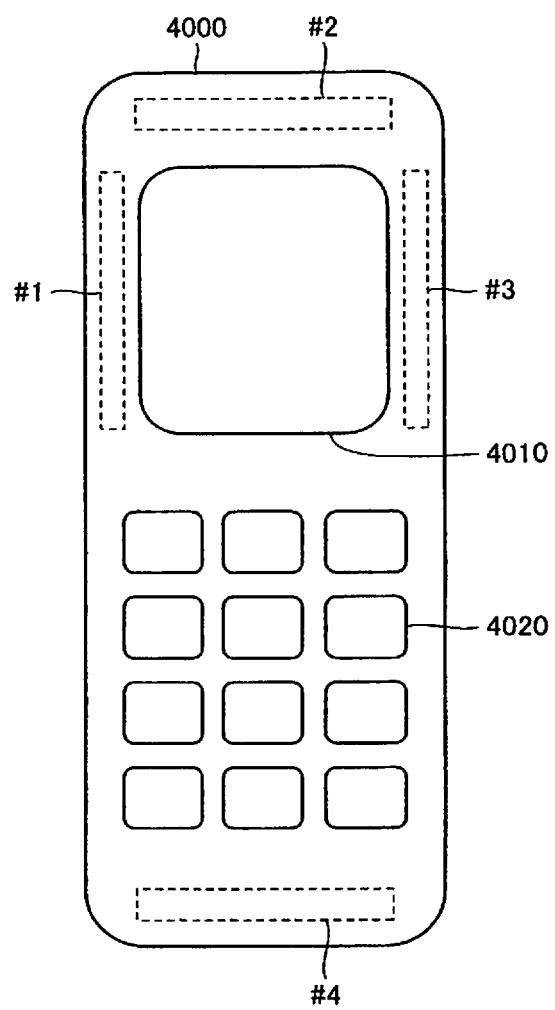
FIG. 10 is a conceptual view illustrating an arrangement of four antennas attached to a mobile phone terminal 4000.

FIG. 10 is a conceptual view illustrating an arrangement of four antennas attached to a mobile phone terminal 4000.

When a plurality of types of antenna elements are incorporated in mobile phone terminal 4000, as shown in FIG. 10, antennas #1 and #3 are arranged longitudinally and in parallel on opposing ends of a display 4010 so as to have an identical plane of polarization (vertical polarization), while antennas #2 and #4 are arranged so as to have an identical plane of polarization (horizontal polarization) with display 4010 and operation buttons 4020 interposed.

Though not specifically limited, antennas #1 and #3 arranged longitudinally may be whip antennas, while antennas #2 and #4 may be inverted-F shaped antennas.

In addition, antennas of the same type such as a chip antenna or a patch antenna may be arranged so as to form a set with respect to the identical plane of polarization.

In the above-described configuration, selection of antennas for forming a subarray may be made such that antennas with the identical plane of polarization form an identical subarray. Here, when a set of antennas constituting a subarray is selected in the second embodiment or the first variation of the second embodiment, or when a subarray is formed by sequentially allocating remaining antennas as described in the second variation of the second embodiment, antennas with the identical plane of polarization are allocated to an identical subarray.

By constituting one subarray with antennas having the identical plane of polarization in such a manner, the following effect can be obtained.

Under a condition of normal radio wave propagation, a path of an incoming radio wave tends to be spatially different if the plane of polarization is different. On the other hand, in order to obtain array gain with an adaptive array, sufficient array gain cannot be obtained if there is a great level difference between reception signals.

Therefore, in selecting a subarray when two subarrays are both available for communication, antennas which have the identical plane of polarization, that is, antennas which are expected to have approximately the same reception levels are selected, whereby sufficient array gain can be obtained.

In other words, constituting a subarray with antennas with the identical plane of polarization is particularly effective in an example in which variation in the reception levels of four antennas is observed due to different planes of polarization, though the reception levels thereof are all higher than the minimum reception level.

Figure 11:
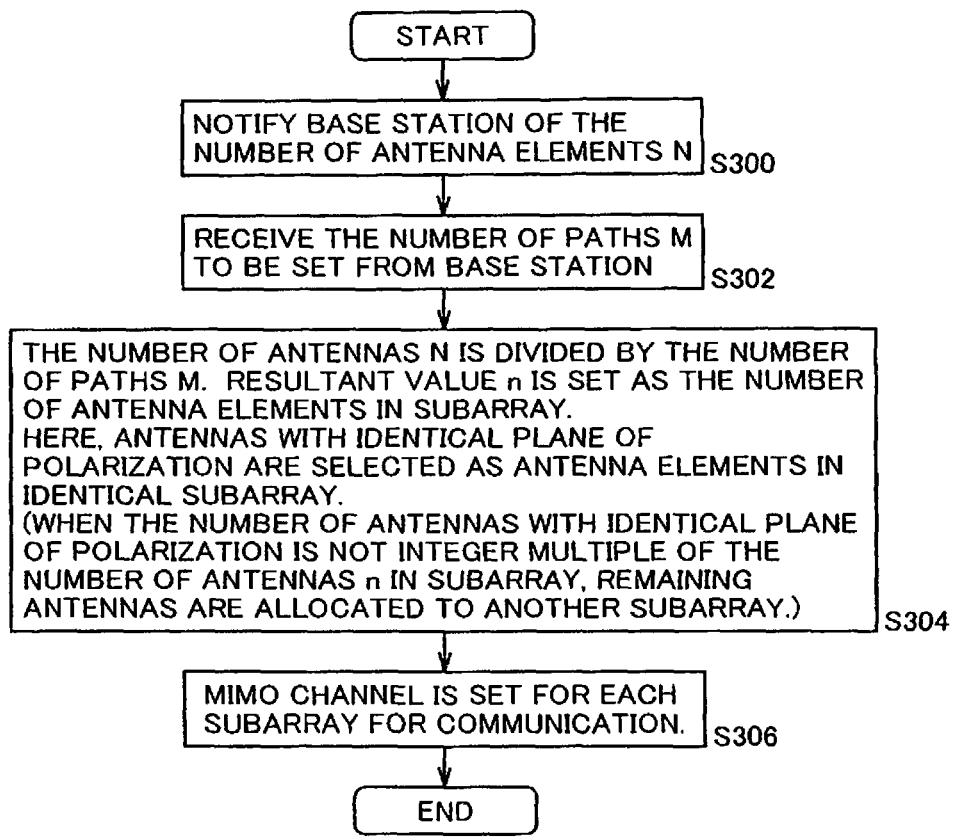
FIG. 11 is a flowchart illustrating an operation when antennas having an identical plane of polarization are selected for a subarray.

FIG. 11 is a flowchart illustrating an operation when antennas having an identical plane of polarization are selected for a subarray.

Referring to FIG. 11, terminal 3000 (or terminal 4000) notifies base station CS1 of the number of antenna elements N (step S300).

In succession, the number of paths M set by base station CS1 is sent back, which is received by mobile terminal 3000 (or terminal 4000) (step S302).

In mobile terminal 3000 (or terminal 4000), the number of antennas N is divided by the number of paths M, and the resultant value n is set as the number of antenna elements in a subarray. Here, antennas having the identical plane of polarization are selected as antenna elements constituting an identical subarray (step S504).

If the number of antennas with the identical plane of polarization is not an integer multiple of the number of antennas n in a subarray, remaining antennas may be allocated to other subarrays.

Then, a channel adapted to the multi-input multi-output scheme (MIMO channel) is set for each subarray between mobile terminal 3000 (or terminal 4000) and base station CS1 for communication (step S306).

With the above-described allocation process of the antennas, communication is achieved by a subarray constituted of a set of antennas implemented by preferentially selecting antennas with the identical plane of polarization for each spatial path.

Figure 12:
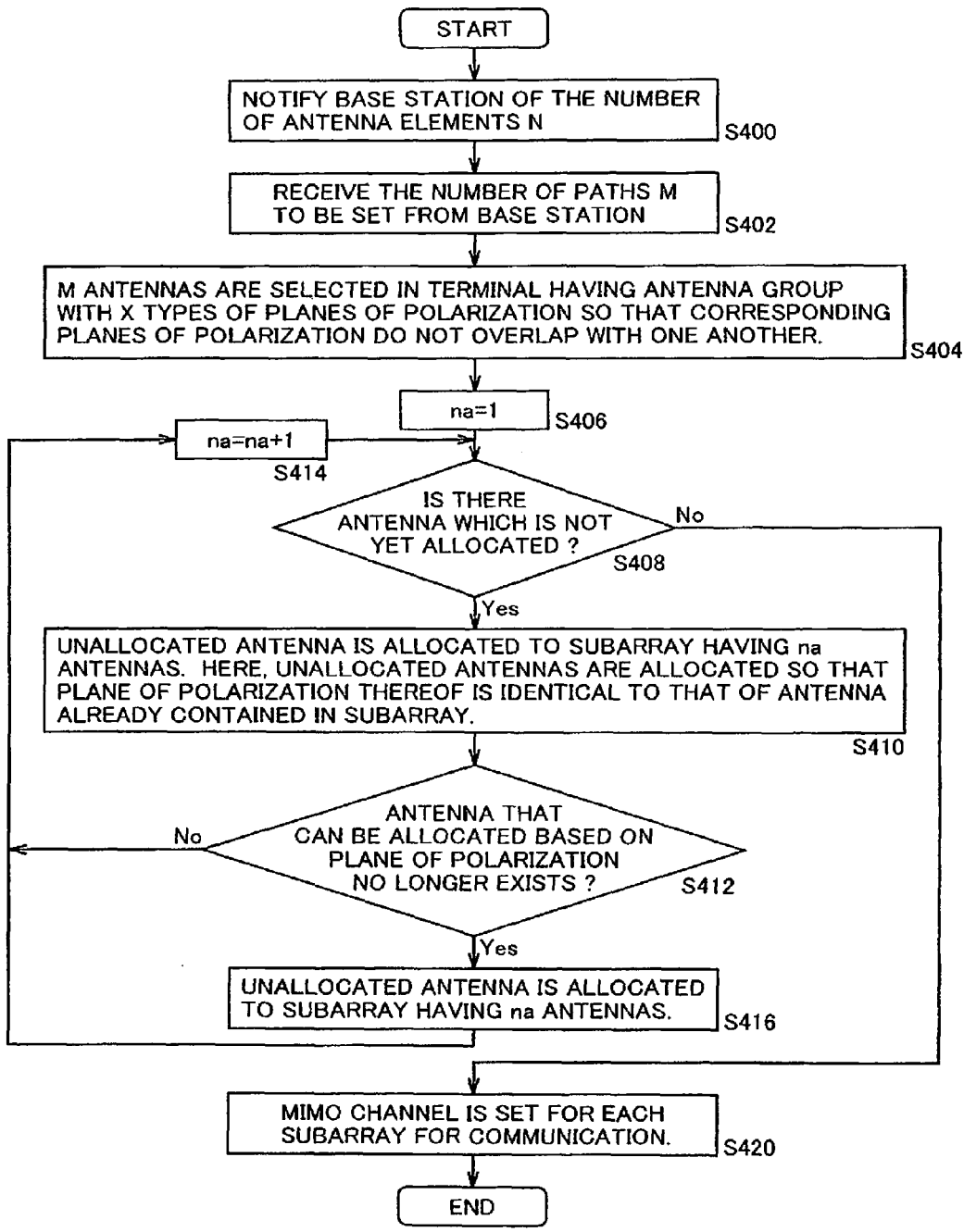
FIG. 12 is a flowchart illustrating another method of allocating a plurality of antennas of a terminal to each path.

FIG. 12 is a flowchart illustrating another method of allocating a plurality of antennas in a terminal to each path.

Referring to FIG. 12, first, terminal 3000 (or terminal 4000) notifies base station CS1 of the number of antenna elements N (step S400).

In succession, the number of paths M set by the base station is sent back, which is received by mobile terminal 3000 (or terminal 4000) (step S402). Mobile terminal 3000 (or terminal 4000) includes an antenna group having x types (x≥M) of planes of polarization. Here, M antennas are selected and allocated to subarrays respectively such that corresponding planes of polarization are not overlapped with one another (step S404).

In succession, a value of a variable na is set to 1 (step S406).

In addition, whether an unallocated antenna is present or not is determined. When an unallocated antenna is present (step S408), the unallocated antenna is allocated to a subarray having na antennas. Here, the unallocated antenna is allocated such that the plane of polarization thereof is identical to that of the antenna already contained in the subarray (step S410).

Next, it is determined whether there is no longer an antenna that can be allocated on the basis of the identical plane of polarization. If an antenna to be allocated on that basis is still present (step S412), the value of variable na is incremented by 1 (step S414), and the processing returns to step S408.

On the other hand, when there is no antenna that can be allocated on the basis of the identical plane of polarization (step S412), an unallocated antenna is allocated to a subarray having na antennas (step S416). Then, the value of variable na is incremented by 1 (step S414), and the processing returns to step S408.

When there is no longer an unallocated antenna in step S408, an MIMO channel is set for each subarray for communication (step S420).

With the above-described allocation process of the antennas as well, communication is achieved by a subarray constituted of a set of antennas implemented by preferentially selecting antennas with the identical plane of polarization for each spatial path.

(Fourth Embodiment)

The third embodiment has described an example in which antennas having the identical plane of polarization constitute a subarray.

Depending on a communication status, however, enhanced transmission/reception performance can be obtained when the subarray is constituted of antennas having different planes of polarization.

Such an example will be described in the following.

In the third embodiment, in selecting antennas for forming a subarray, for example, a set of antennas can be selected so that antennas having reception levels or antenna gains proximate to one another are located in an identical subarray. Alternatively, the reception level is measured for each antenna in advance and antennas are ranked in terms of the reception level. The antennas can be allocated to a subarray so that antennas in a high rank in terms of the reception level are not unevenly distributed in a specific subarray.

Here, when a set of antennas constituting a subarray is selected in the second embodiment or the first variation of the second embodiment, or when a subarray is formed by sequentially allocating remaining antennas as described in the second variation of the second embodiment, antennas having reception levels or antenna gains proximate to one another are allocated to an identical subarray.

Under a condition of normal radio wave propagation, a path of an incoming radio wave will spatially be different if the plane of polarization is different. Accordingly, if something crosses the propagation path of the radio wave between the terminal and the base station, a phenomenon called "shadowing" in which reception power in a communication path abruptly falls may occur, when the communication path is formed solely by antennas with the identical plane of polarization.

If shadowing occurs, in some cases, the reception power in the path may abruptly fall as low as a level at which communication is difficult. In such a case, communication in that path may be disconnected. Therefore, in a communication environment in which shadowing often takes place, it is desirable to locate antennas with different planes of polarization in the identical subarray. With such a configuration of a subarray, even if the reception level of an antenna with a specific plane of polarization falls to a level disabling communication, an antenna with a different plane of polarization can maintain a level allowing reception. Accordingly, communication in all communication paths can be maintained.

As such, in control unit CNP, it is possible to selectively employ a method of constituting a subarray as described in the third embodiment and a method of constituting a subarray described below, in accordance with a degree of stability in path multiplicity and by comparing a current communication status and an allocation state of antennas to a subarray.

Figure 13:
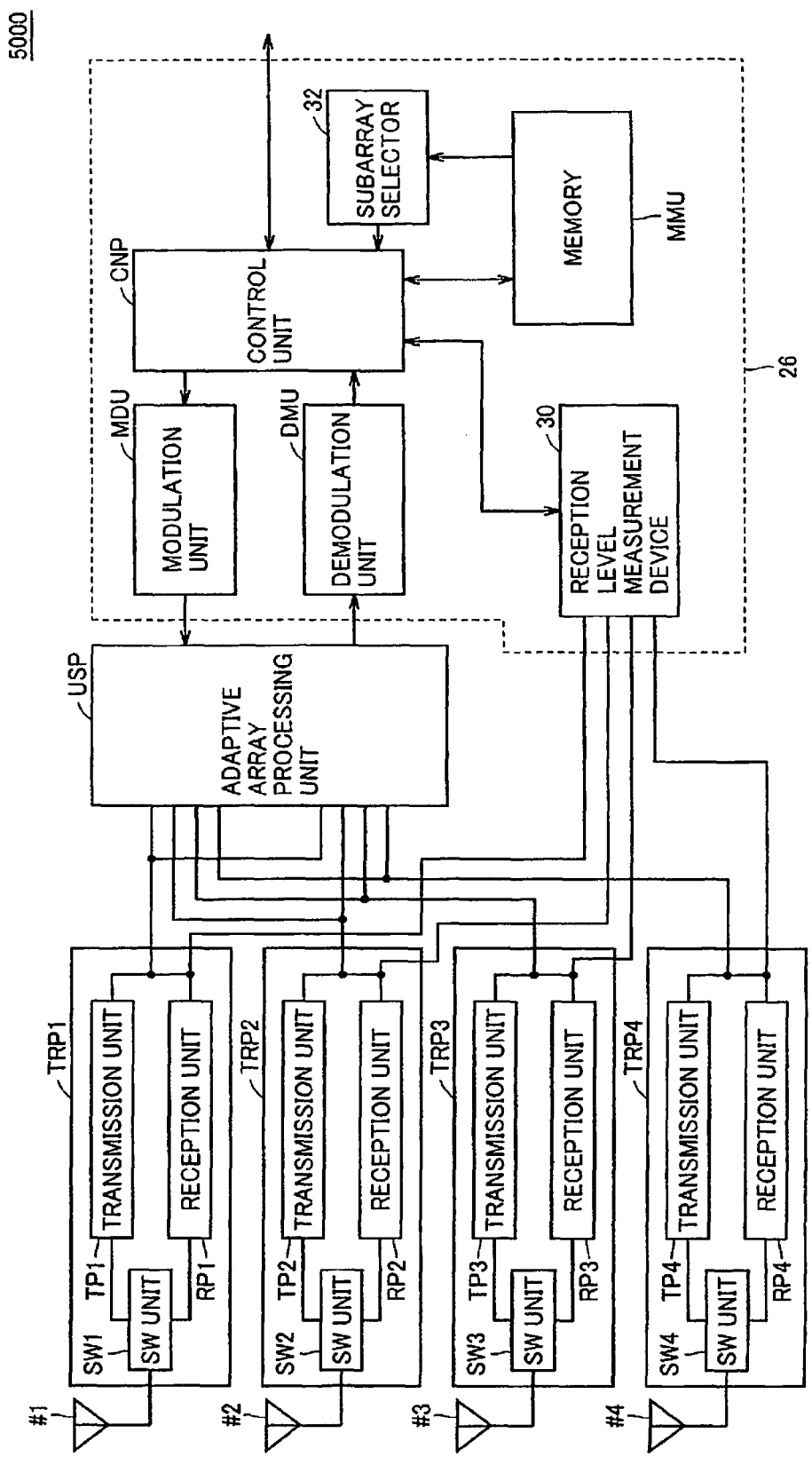
FIG. 13 is a schematic block diagram illustrating a configuration of a PDMA terminal 5000.

FIG. 13 is a schematic block diagram illustrating a configuration of a PDMA terminal 5000 capable of selecting antennas constituting a subarray based on information on the reception level or the plane of polarization as described above.

PDMA terminal 5000 is different from PDMA terminal 1000 in the first embodiment shown in FIG. 1 in that a reception level measurement device 30 capable of measuring a reception level for each antenna with respect to reception signals from respective antennas #1 to #4 is provided, a measurement result of the reception level measurement device is provided to control unit CNP, and control unit CNP causes memory MMU to store information on the reception level.

In addition, memory MMU stores not only the measurement result of the reception level, but also information on the plane of polarization of the antenna and information on occurrence of communication disruption seemingly caused by shadowing. In response, a subarray selector 32 notifies control circuit CNP of a set of antennas to be selected as a subarray, from the information on the plane of polarization of the antenna, the information on shadowing or the like stored in the memory.

In other words, reception level measurement device 30 measures the reception level for each antenna. Control circuit CNP measures reception level data for each antenna for a prescribed period of time, and measures "shadowing information" such as duration or frequency of a case in which reception is disabled for each antenna. Such results are stored in memory MMU. Subarray selector 32 selects a pair (or a set) of antennas to be selected as a subarray, from the shadowing information and the information on the plane of polarization in each antenna in memory MMU.

Figure 14:
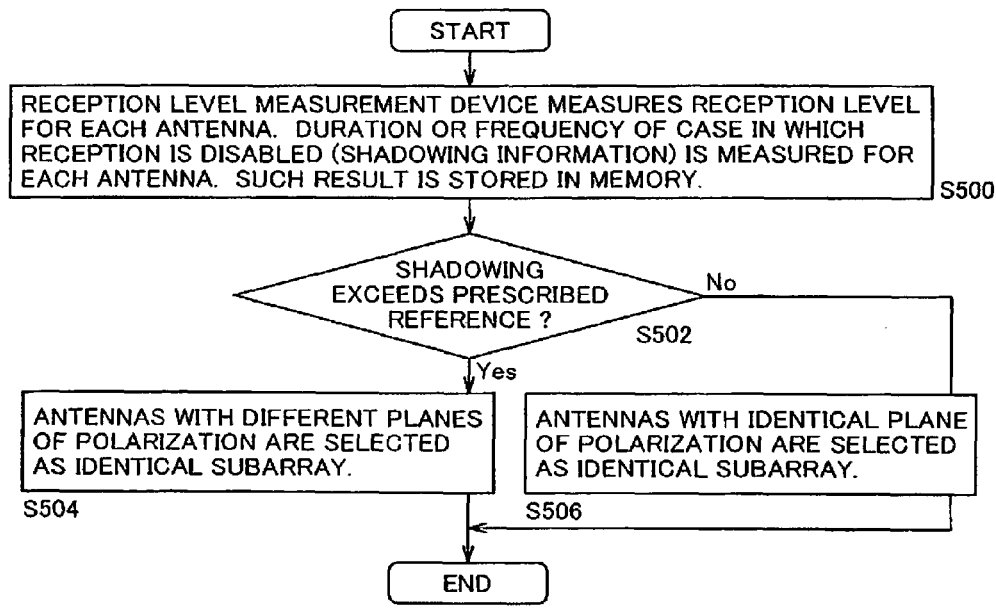
FIG. 14 is a flowchart illustrating an operation of a control circuit CNP and a subarray selector 32.

FIG. 14 is a flowchart illustrating an operation of control circuit CNP and subarray selector 32 among the operations described above.

First, control circuit CNP measures the reception level for each antenna in reception level measurement device 30, and measures duration or frequency of a case in which reception is disabled (shadowing information) for each antenna. Such results are stored in memory MMU (step S500).

Then, control unit CNP determines whether or not shadowing exceeds a prescribed reference (step S502).

Here, though not limited in particular, "a prescribed reference" refers to a determination reference such as whether or not shadowing lasting at least for a prescribed duration (0.5 second) occurs with a frequency more than a prescribed level (two times/60 seconds), for example.

When it is determined that shadowing exceeds the prescribed reference in step S302, subarray selector 32 selects antennas with different planes of polarization as an identical subarray (step S504).

On the other hand, when it is determined that shadowing does not exceed the prescribed reference in step S502, subarray selector 32 selects antennas with an identical plane of polarization as an identical subarray (step S506). Selection of a subarray in this case may follow the procedure described with reference to FIG. 11 or 12.

Figure 15:
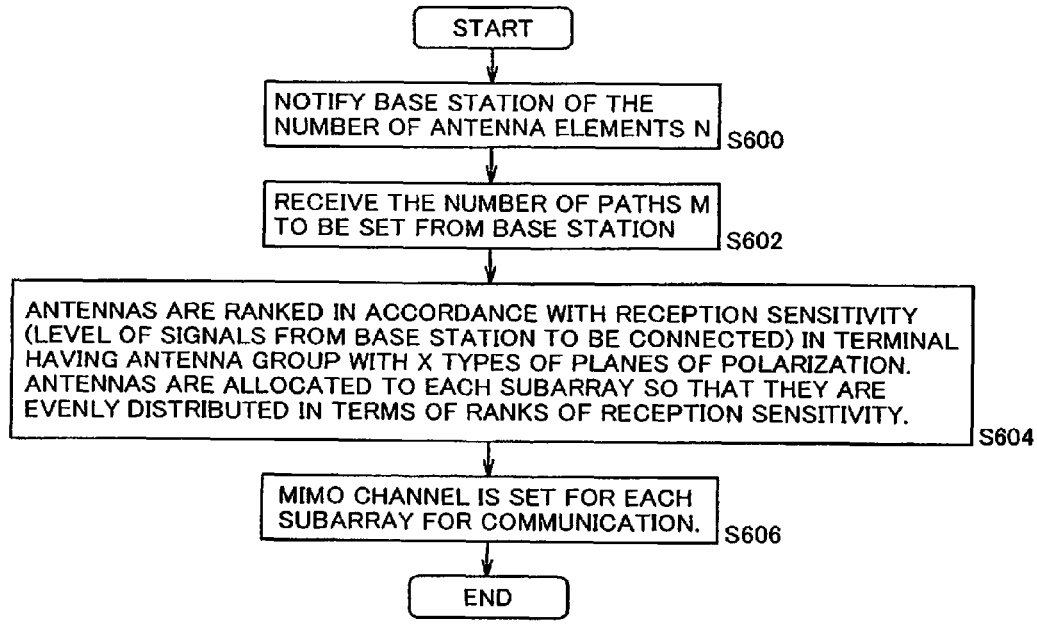
FIG. 15 is a flowchart illustrating a processing for allocating antennas in terminal 5000 to respective paths based on a reception level.

FIG. 15 is a flowchart illustrating a processing for allocating antennas in terminal 5000 to each path based on a reception level, when antennas having different planes of planarization are selected as an identical subarray in step S504 shown in FIG. 14.

First, terminal 5000 notifies base station CS1 of the number of antenna elements N (step S600).

In succession, terminal 5000 is notified of the number of paths M to be set from base station CS1 (step S602).

Terminal 5000 includes an antenna group having x types (x≥M) of planes of polarization. Terminal 5000 ranks the antennas in accordance with reception sensitivity (levels of signals from a base station to be connected). Then, antennas are allocated to each subarray so that antennas in a high rank in terms of the reception sensitivity are not unevenly distributed in a specific subarray, that is, an average of the reception levels is proximate to each other in each subarray, for example (step S604).

An MIMO channel is set for each subarray constituted in the above-described manner for communication (step S606).

With the method described above, stable communication adapted to the MIMO scheme can be achieved even in the communication environment where shadowing frequently takes place.

Here, antennas having the reception level or the reception sensitivity proximate to each other may preferentially be allocated to an identical subarray in step S604 so that the reception level or the reception sensitivity of antennas are balanced in forming a spatial path.

(Fifth Embodiment)

The third and fourth embodiments have described the arrangement of the antennas in a terminal and how antennas are allocated to each subarray in accordance with the communication status in initiating communication in the MIMO scheme.

Meanwhile, even after communication in the MIMO scheme is once started, it is also possible to control communication in the MIMO scheme adaptively in accordance with the communication status, by changing antennas allocated to a subarray in accordance with a change in the communication status in each spatial path.

Here, the communication status in each spatial path may refer to the FER for each spatial path described with reference to FIG. 5, or an amount of interference for each spatial path described in connection with FIG. 6, or alternatively, change with time in the reception level for each antenna described with reference to FIG. 13.

Figure 16:
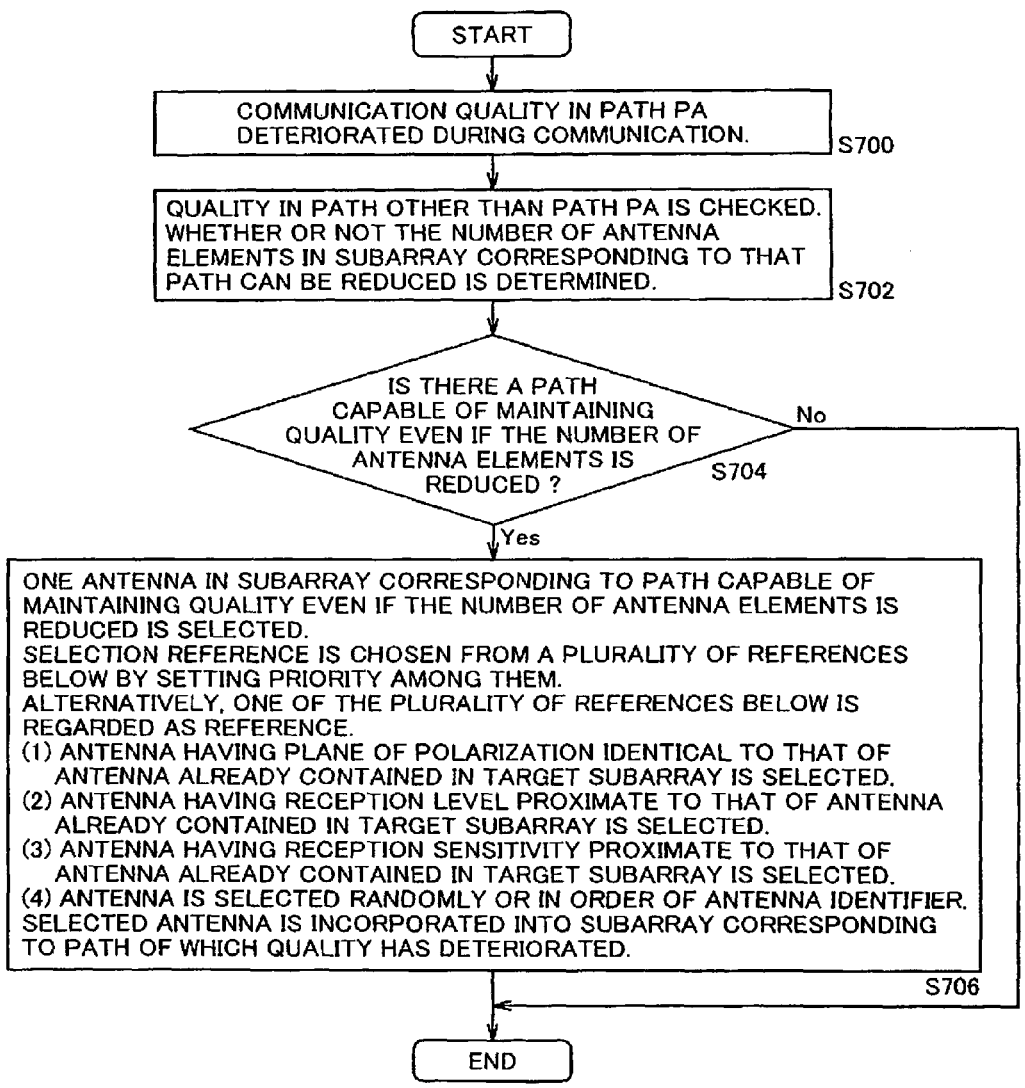
FIG. 16 is a flowchart illustrating another method of allocating each antenna to each path based on the reception level.

FIG. 16 is a flowchart illustrating another method of allocating each antenna to each path based on the reception level.

For example, when it is determined based on FER or the interference value that the communication quality in a path PA has deteriorated during communication (step S700), quality in a path other than path PA is checked, and whether or not the number of antenna elements in a subarray corresponding to that other path can be reduced is determined (step S702).

When a path capable of maintaining quality even if the number of antenna elements is reduced is present (step S704), one antenna in a subarray corresponding to the path capable of maintaining quality even if the number of antenna elements is reduced is selected.

A selection reference here is chosen from a plurality of references below by setting priority among them in advance. Alternatively, one of the plurality of references below may be chosen as a reference.

(1) An antenna having a plane of polarization identical to that of an antenna already contained in the target subarray is selected.

(2) An antenna having a reception level proximate to that of an antenna already contained in the target subarray is selected.

(3) An antenna having reception sensitivity proximate to that of an antenna already contained in the target subarray is selected.

(4) An antenna is selected randomly or in the order of antenna identifier.

An antenna selected in such a manner is incorporated in the subarray corresponding to the path in which quality has deteriorated (step S706).

Alternatively, when there is no path for which the number of antennas can be reduced in step S704, the processing in step S706 is not performed but communication is maintained in current state.

Figure 17:
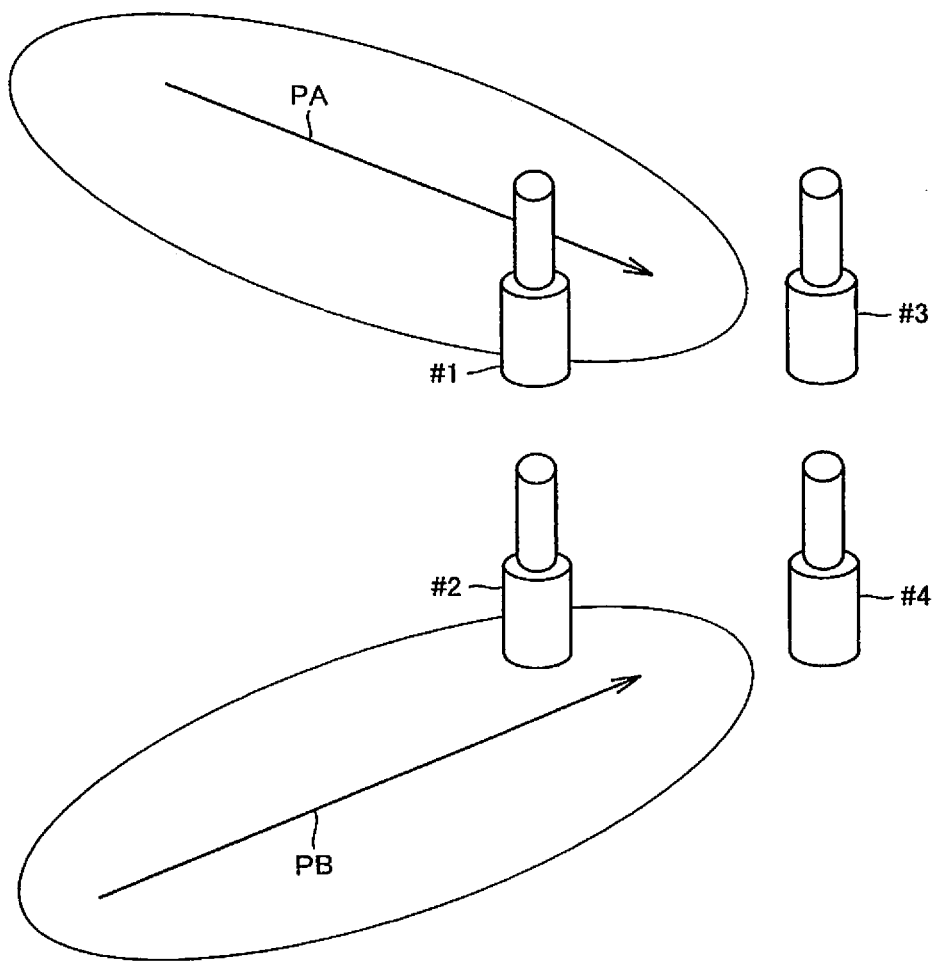
FIG. 17 is a conceptual view illustrating a configuration before and after a combination of antennas constituting a path is changed.

FIG. 17 is a conceptual view illustrating a configuration before and after a combination of antennas forming a path is changed in the above-described manner.

Before changing the combination, antennas #1 and #3 form one path, while antennas #2 and #4 form one path. Here, antennas #1 and #3 may have an identical plane of polarization, while antennas #2 and #4 may have an identical plane of polarization. Alternatively, a configuration in which a set of antennas #1 and #3 and a set of antennas #2 and #4 form subarrays respectively may minimize a difference in the reception levels between the two sets.

Here, it is assumed that deterioration in the communication quality in path PA formed by antennas #2 and #3 has been determined.

Figure 18:
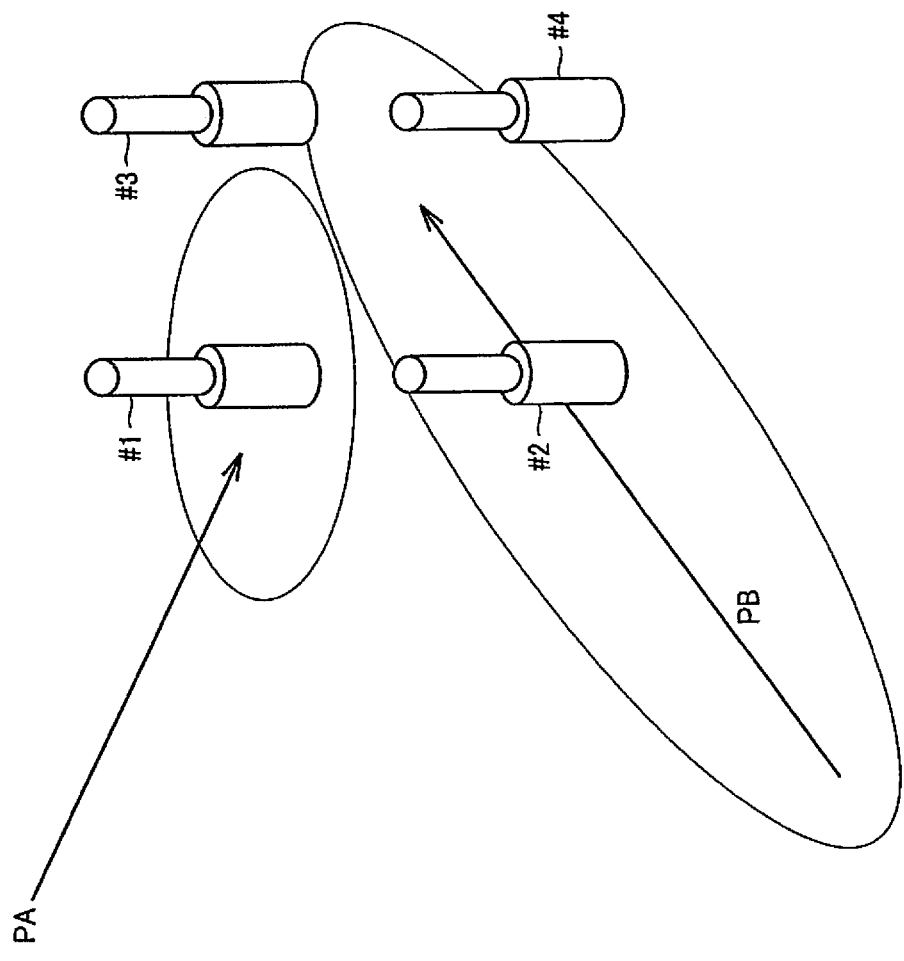
FIG. 18 is a conceptual view illustrating a state after a combination in a subarray is changed as a result of detection of deterioration in communication quality as shown in FIG. 17.

FIG. 18 is a conceptual view illustrating a state after a combination in a subarray is changed as a result of detection of deterioration in communication quality as shown in FIG. 17.

As shown in FIG. 18, for example, antenna #3 is incorporated in a path PB, antennas #2, #3 and #4 form one path, and antenna #1 alone performs transmission/reception in path PA.

In this manner, even if the communication quality is deteriorated, the number of antennas constituting the sub array is changed so as to maintain desired communication quality, thereby enabling transmission/reception in the MIMO scheme.

Here, a processing such as an adaptive array processing, a modulation processing, a demodulation processing, or a control processing performed by any PDMA terminal described above can be performed, individually or as an integrated processing, with software by means of a digital signal processor.

As described above, according to the present invention, in a terminal or a base station in a mobile communication system adapted to the MIMO scheme, communication in each spatial path is established by antennas divided into subarrays. As the antennas corresponding to each path or the number of paths are adaptively controlled in accordance with a communication status, stable communication in the MIMO scheme can be achieved.

Industrial Applicability

The present invention is useful in a mobile communication system adapted to the MIMO scheme, because stable communication can be achieved by adaptively controlling the antennas corresponding to each path or the number of paths in accordance with a communication status, in a terminal or a base station in a mobile communication system adapted to the MIMO scheme.

The invention claimed is:

1. A radio apparatus for communication by forming a plurality of spatial signals to another radio apparatus, comprising:
a plurality of transmission units connectable to a plurality of antennas;
at least a signal processing unit capable of processing spatial signals to be transmitted through the plurality of transmission units and the plurality of antennas;
storage means for storing in advance information on the number of spatial signals that can be processed by the signal processing unit, wherein the number of spatial signals is smaller than or equal to the total number of the plurality of antennas;
control means for controlling a process of transmitting the information on the number of spatial signals.

2. The radio apparatus according to claim 1, wherein the plurality of antennas are divided into a plurality of sub-arrays of antennas, each of the sub-arrays of antennas corresponding to one of the spatial signals.

3. The radio apparatus according to claim 1, wherein the signal processing unit is configured to change a combination of the antennas allocated to each of the sub-arrays of antennas.

4. The radio apparatus according to claim 3, wherein the radio apparatus further comprises monitor means for monitoring communication quality for each spatial signal during communication, and the control means is configured to change the number of the antennas allocated to each of the sub-arrays in accordance with a detection result of the monitor means.

5. The radio apparatus according to claim 1, wherein the information on the number of spatial signals is transmitted before the communication with the another radio apparatus is started.

6. The radio apparatus according to claim 1, wherein the information on the number of spatial signals is transmitted at a control information stage during establishing the traffic channel.

7. The radio apparatus according to claim 2, wherein a MIMO channel is set for each of the sub-arrays for communication with the another radio apparatus.

8. The radio apparatus according to claim 2, wherein the signal processing unit is configured to determine the number of sub-arrays based on a number of signals notified by a radio base station apparatus.

9. The radio apparatus according to claim 2, wherein the control means is configured to allocate one of the plurality of antennas to each of the sub-arrays in a number corresponding to the number of signals notified by a radio base station apparatus and subsequently, to allocate the remaining antennas to each of the sub-arrays in a prescribed order.

10. The radio apparatus according to claim 2, wherein each of the sub-arrays is allocated antennas having an identical plane of polarization.

11. The radio apparatus according to claim 1, further comprising means for detecting a reception level for each antenna, wherein the antennas are allocated to each of the sub-arrays based on the detected reception level.

12. A radio apparatus for communication by forming a plurality of spatial signals to another radio apparatus, comprising:
a plurality of transmission units connectable to a plurality of antennas;
a signal processing unit capable of processing spatial signals to be transmitted through the plurality of transmission units and the plurality of antennas;
a storage unit that stores in advance information on the number of spatial signals that can be processed by the signal processing unit, wherein the number of spatial signals is smaller than or equal to the total number of the plurality of antennas;
a control unit that controls a process of transmitting the information on the number of spatial signals.

13. The radio apparatus according to claim 12, wherein the plurality of antennas are divided into a plurality of sub-arrays of antennas, each of the sub-arrays of antennas corresponding to one of the spatial signals.

14. The radio apparatus according to claim 12, wherein the signal processing unit is configured to change a combination of the antennas allocated to each of the sub-arrays of antennas.

15. The radio apparatus according to claim 14, wherein the radio apparatus further comprises a monitor unit that monitors communication quality for each spatial signal during communication, and the control unit is configured to change the number of the antennas allocated to each of the sub-arrays in accordance with a detection result of the monitor unit.

16. The radio apparatus according to claim 12, wherein the information on the number of spatial signals is transmitted before the communication with the another radio apparatus is started.

17. The radio apparatus according to claim 12, wherein the information on the number of spatial signals is transmitted at a control information stage during establishing the traffic channel.

18. The radio apparatus according to claim 13, wherein a MIMO channel is set for each of the sub-arrays for communication with the another radio apparatus.

19. The radio apparatus according to claim 13, wherein the signal processing unit is configured to determine the number of sub-arrays based on a number of signals notified by a radio base station apparatus.

20. The radio apparatus according to claim 13, wherein the control unit is configured to allocate one of the plurality of antennas to each of the sub-arrays in a number corresponding to the number of signals notified by a radio base station apparatus and subsequently, to allocate the remaining antennas to each of the sub-arrays in a prescribed order.

* * * * *